(12) United States Patent
Hong et al.

(10) Patent No.: US 12,422,851 B2
(45) Date of Patent: Sep. 23, 2025

(54) ROBOT OPERABLE TO DISEMBARK FROM ESCALATOR AND METHOD OF CONTROLLING SAME

(71) Applicant: SAMSUNG ELECTRONICS CO., LTD., Suwon-si (KR)

(72) Inventors: Hyunki Hong, Suwon-si (KR); Youngil Koh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 18/383,129

(22) Filed: Oct. 24, 2023

(65) Prior Publication Data
US 2024/0069555 A1  Feb. 29, 2024

Related U.S. Application Data

(63) Continuation of application No. PCT/KR2023/012572, filed on Aug. 24, 2023.

(30) Foreign Application Priority Data

Aug. 24, 2022  (KR) .................. 10-2022-0106245

(51) Int. Cl.
*G05D 1/00* (2024.01)
*B66B 25/00* (2006.01)

(52) U.S. Cl.
CPC .......... *G05D 1/0214* (2013.01); *B66B 25/003* (2013.01); *G05D 1/0223* (2013.01); *G05D 1/0246* (2013.01)

(58) Field of Classification Search
CPC .. G05D 1/0214; G05D 1/0223; G05D 1/0246; G05D 2105/30; G05D 2107/60;
(Continued)

(56) References Cited

U.S. PATENT DOCUMENTS 10,266,097 B2  4/2019  Takahata et al.
11,269,328 B2  3/2022  Kim et al.
(Continued)

FOREIGN PATENT DOCUMENTS

CN   113651220 A   11/2021
CN   113651221 A   11/2021
(Continued)

OTHER PUBLICATIONS

International Search Report dated Dec. 7, 2023, issued by the International Searching Authority in counterpart International Application No. PCT/KR2023/012572 (PCT/ISA/210).
Written Opinion dated Dec. 7, 2023, issued by the International Searching Authority in International Application No. PCT/KR2023/012572 (PCT/ISA/237).

*Primary Examiner* — Bao Long T Nguyen
(74) *Attorney, Agent, or Firm* — Sughrue Mion, PLLC

(57) ABSTRACT

Provided is a robot and method of controlling same, where the robot includes: a sensor; a driver; a memory storing an instruction; and a processor configured to execute the instruction to: identify, through the sensor, a height difference between a first stair and a second stair of an escalator, identify whether the robot is adjacent to a disembarkment area of the escalator based on the identified height difference, based on identifying that the robot is adjacent to the disembarkment area, identify, through the sensor, whether an object is located within a first distance of the robot in a movement direction of the escalator, and based on identifying the object located within the first distance of the robot in the movement direction of the escalator, control the driver to cause the robot to move on the escalator in a direction opposite to the movement direction of the escalator.

20 Claims, 14 Drawing Sheets

(58) Field of Classification Search
CPC .... G05D 2109/10; G05D 1/435; G05D 1/633; G05D 1/0212; G05D 1/622; B66B 25/003; B25J 5/00; B25J 9/16; B25J 13/08; B25J 19/02; B25J 5/007; B25J 9/1664; B25J 9/1679; B25J 9/1697; B25J 19/023

See application file for complete search history.

(56) References Cited

U.S. PATENT DOCUMENTS

| | | | |
|---|---|---|---|
| 11,529,736 | B2 | 12/2022 | Badiozamani et al. |
| 2019/0369622 | A1* | 12/2019 | Kim ................... G05D 1/0088 |
| 2020/0253445 | A1 | 8/2020 | So et al. |
| 2021/0299873 | A1* | 9/2021 | Badiozamani ......... B25J 9/1653 |

FOREIGN PATENT DOCUMENTS

| | | | | |
|---|---|---|---|---|
| CN | 113753723 A | | 12/2021 | |
| JP | 2012115313 A | * | 6/2012 | |
| JP | 2017-21570 A | | 1/2017 | |
| JP | 2019-1613 A | | 1/2019 | |
| KR | 10-2019-0086628 A | | 7/2019 | |
| KR | 10-2012548 B1 | | 8/2019 | |
| KR | 10-2020-0103900 A | | 9/2020 | |
| KR | 2020103900 A | * | 9/2020 | .............. A47L 11/24 |
| KR | 10-2240688 B1 | | 4/2021 | |
| KR | 10-2021-0110610 A | | 9/2021 | |
| KR | 10-2307777 B1 | | 10/2021 | |

* cited by examiner

ROBOT OPERABLE TO DISEMBARK FROM ESCALATOR AND METHOD OF CONTROLLING SAME

CROSS-REFERENCE TO RELATED APPLICATIONS

This application is a continuation application of International Application No. PCT/KR2023/012572, filed on Aug. 24, 2023, which claims priority to Korean Patent Application No. 10-2022-0106245, filed on Aug. 24, 2022, in the Korean Intellectual Property Office, the disclosures of which are incorporated by reference herein in their entireties.

BACKGROUND

1. Field

The disclosure relates to a robot and a method of controlling the same, and more particularly, to a robot operable to disembark from an escalator and a method of controlling the same.

2. Description of the Related Art

Recently, with the development of electronic technology, robots are being used in various industrial fields. With the development of object recognition technology, robots may accurately distinguish various objects, and with the development of autonomous driving technology, robots may travel safely without interfering with human traffic in the travel space. It can be seen that robots such as serving robots serving food ordered by users in restaurants and guide robots guiding users on the way in airports, large marts, or the like are used in various fields and ways.

As robots are used in various fields, a type and size of a space in which the robots travel have also diversified. In the past, robots can only travel in narrow and confined spaces, but can now travel in wider and more open spaces.

In the case of large buildings composed of multiple floors, such as large markets and airports, robots may move between floors in large buildings using escalators. However, when a robot uses an escalator, an accident in which the robot and a passenger collide unintentionally may occur due to the automatically moving escalator. For example, when a robot gets off an escalator and a passenger stays at an exit of the escalator, the accident in which a robot disembarking from the escalator and a passenger collide may occur.

In particular, such a collision accident occurs more frequently when the robot gets off the escalator. Therefore, there is a need for a method of more safely allowing a robot to disembark from an escalator.

SUMMARY

The disclosure provides a robot operable to disembark from an escalator and a method of controlling the same.

According to an aspect of the disclosure, a robot includes: at least one sensor; a driver; at least one memory storing at least one instruction; and at least one processor configured to execute the at least one instruction to: identify, through the at least one sensor, a height difference between a first stair and a second stair of an escalator, identify whether the robot is adjacent to a disembarkment area of the escalator based on the identified height difference, based on identifying that the robot is adjacent to the disembarkment area, identify, through the at least one sensor, whether an object is located within a first distance of the robot in a movement direction of the escalator, and based on identifying the object located within the first distance of the robot in the movement direction of the escalator, control the driver to cause the robot to move on the escalator in a direction opposite to the movement direction of the escalator.

The second stair may be a stair adjacent to the first stair in the movement direction of the escalator, and the at least one processor may be further configured to execute the at least one instruction to identify that the robot is adjacent to the disembarkment area of the escalator based on identifying that the identified height difference is less than a predetermined value.

The robot may further include: a communication interface, and the at least one processor may be further configured to execute the at least one instruction to: based on the driver causing the robot to move in the direction opposite to the movement direction of the escalator, identify, through the at least one sensor, whether a second object is located within a second distance of the robot in the direction opposite to the movement direction of the escalator, and based on identifying the second object located within the second distance of the robot in the direction opposite to the movement direction of the escalator, transmit a control signal for stopping the escalator through the communication interface.

The at least one processor may be further configured to execute the at least one instruction to control the driver to cause the robot to move in the direction opposite to the movement direction of the escalator at a movement speed of the escalator.

The robot may further include: a camera, and the at least one processor may be further configured to execute the at least one instruction to: acquire a plurality of images of the escalator through the camera, based on identifying that the robot is adjacent to the disembarkment area of the escalator, identify a boundary line between the first stair and the second stair based on the acquired plurality of images, and identify the movement speed of the escalator based on a movement speed of the identified boundary line.

The at least one processor may be further configured to execute the at least one instruction to: identify a third stair of the escalator based on the robot being positioned on the third stair, identify a fourth stair of the escalator based on the fourth stair being adjacent to the third stair in the movement direction of the escalator, and identify the movement speed of the escalator based on an elapsed time between a first time corresponding to identifying an initial height difference between the third stair and the fourth stair and a second time corresponding to identifying a maximum height difference between the third stair and the fourth stair.

The at least one processor may be further configured to execute the at least one instruction to: while the robot moves in the direction opposite to the movement direction of the escalator, based on identifying, through the at least one sensor, that the object located in the movement direction of the escalator is no longer located within the first distance of the robot, control the driver to cause the robot to move in the movement direction of the escalator and to enter the disembarkment area.

The driver comprises a plurality of wheels, and wherein the at least one processor is further configured to execute the at least one instruction to: while the robot moves in the direction opposite to the movement direction of the escalator, control the driver to cause at least one of the plurality of wheels to be located within the disembarkment area and to cause a remainder of the plurality of wheels to be located on the escalator, and control the driver to cause the remainder of the plurality of wheels to rotate in the direction opposite to the movement direction of the escalator.

According to an aspect of the disclosure, a method of controlling a robot includes: identifying, through at least one sensor of the robot, a height difference between a first stair and a second stair of an escalator; identifying whether the robot is adjacent to a disembarkment area of the escalator based on the identified height difference; based on identifying that the robot is adjacent to the disembarkment area, identifying whether an object is located within a first distance of the robot in a movement direction of the escalator; and based on identifying the object located within the first distance of the robot in the movement direction of the escalator, controlling a driver of the robot to cause the robot to move on the escalator in a direction opposite to the movement direction of the escalator.

The second stair may be a stair adjacent to the first stair in the movement direction of the escalator, and the identifying whether the robot is adjacent to the disembarkment area may further include identifying that the robot is adjacent to the disembarkment area based on identifying that the identified height difference is less than a predetermined value.

The method may further include: based on the driver causing the robot to move in the direction opposite to the movement direction of the escalator, identifying, through the at least one sensor, whether a second object is located within a second distance of the robot in the direction opposite to the movement direction of the escalator; and based on identifying the second object located within the second distance of the robot in the direction opposite to the movement direction of the escalator, transmitting a control signal for stopping the escalator through a communication interface of the robot.

The controlling the driver may further include controlling the driver to cause the robot to move in the direction opposite to the movement direction of the escalator at a movement speed of the escalator.

The method may further include: acquiring a plurality of images of the escalator through a camera of the robot; based on identifying that the robot is adjacent to the disembarkment area of the escalator, identifying a boundary line between the first stair and the second stair based on the acquired plurality of images; and identifying the movement speed of the escalator based on the movement speed of the identified boundary line.

The method may further include: identifying a third stair of the escalator based on the robot being positioned on the third stair; identifying a fourth stair adjacent to the third stair in the movement direction of the escalator; and identifying the movement speed of the escalator based on an elapsed time between a first time corresponding to identifying an initial height difference between the third stair and the fourth stair and a second time corresponding to identifying a maximum height difference between the third stair and the fourth stair.

The method may further include: while the robot moves in the direction opposite to the movement direction of the escalator, based on identifying, through the at least one sensor, that the object located in the movement direction of the escalator is no longer located within the first distance of the robot, controlling the driver to cause the robot to move in the movement direction of the escalator and to enter the disembarkment area.

According to an aspect of the disclosure, a non-transitory computer readable medium having instructions stored therein, which when executed by at least one processor cause the at least one processor to execute a method of controlling a robot, wherein the method includes: identifying, through at least one sensor of the robot, a height difference between a first stair and a second stair of an escalator; identifying whether the robot is adjacent to a disembarkment area of the escalator based on the identified height difference; based on identifying that the robot is adjacent to the disembarkment area, identifying whether an object is located within a first distance of the robot in a movement direction of the escalator; and based on identifying the object located within the first distance of the robot in the movement direction of the escalator, controlling a driver of the robot to cause the robot to move on the escalator in a direction opposite to the movement direction of the escalator.

The second stair may be a stair adjacent to the first stair in the movement direction of the escalator, and the identifying whether the robot is adjacent to the disembarkment area may further include identifying that the robot is adjacent to the disembarkment area based on identifying that the identified height difference is less than a predetermined value.

The non-transitory computer readable medium, wherein the method may further include: based on the driver causing the robot to move in the direction opposite to the movement direction of the escalator, identifying, through the at least one sensor, whether a second object is located within a second distance of the robot in the direction opposite to the movement direction of the escalator; and based on identifying the second object located within the second distance of the robot in the direction opposite to the movement direction of the escalator, transmitting a control signal for stopping the escalator through a communication interface of the robot.

The controlling the driver may further include controlling the driver to cause the robot to move in the direction opposite to the movement direction of the escalator at a movement speed of the escalator.

The non-transitory computer readable medium, wherein the method may further include: acquiring a plurality of images of the escalator through a camera of the robot; based on identifying that the robot is adjacent to the disembarkment area of the escalator, identifying a boundary line between the first stair and the second stair based on the acquired plurality of images; and identifying the movement speed of the escalator based on the movement speed of the identified boundary line.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
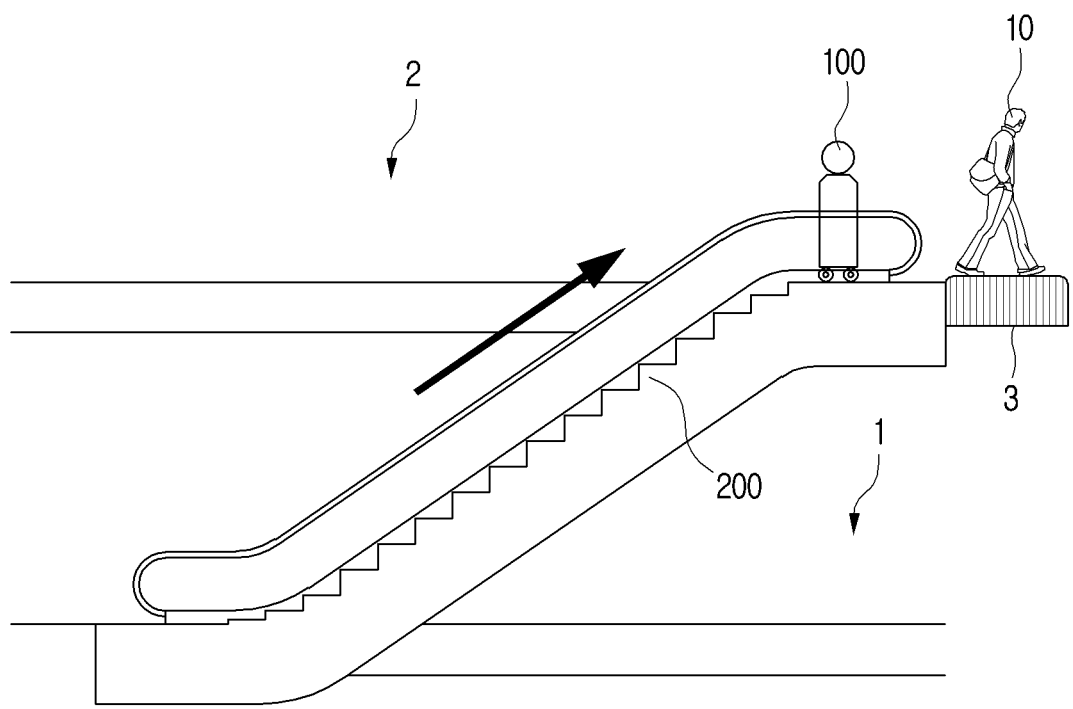
FIG. 1 is an exemplary view of a robot disembarking from an escalator.

Because the disclosure may be variously modified and have several embodiments, specific embodiments of the disclosure will be illustrated in the drawings and be described in detail in the detailed description. However, it is to be understood that the disclosure is not limited to specific embodiments, but includes all modifications, equivalents, and substitutions according to embodiments of the disclosure. Throughout the accompanying drawings, similar components will be denoted by similar reference numerals.

In describing the disclosure, when it is decided that a detailed description for the known functions or configurations related to the disclosure may unnecessarily obscure the gist of the disclosure, such detailed description will be omitted.

In addition, the following embodiments may be modified in several different forms, and the scope and spirit of the disclosure are not limited to the following exemplary embodiments. Rather, these exemplary embodiments make the disclosure thorough and complete, and are provided to completely transfer the spirit of the disclosure to those skilled in the art.

Terms used in the disclosure are used only to describe specific exemplary embodiments rather than limiting the scope of the disclosure. Singular forms are intended to include plural forms unless the context clearly indicates otherwise.

In the disclosure, an expression "have," "may have," "include," "may include," "comprise," "may comprise," or the like, indicates existence of a corresponding feature (for example, a numerical value, a function, an operation, a component such as a part, or the like), and does not exclude existence of an additional feature.

In the disclosure, an expression "A or B," "at least one of A or/and B," "one or more of A or/B," or the like, may include all possible combinations of items enumerated together. For example, "A or B," "at least one of A and B," and "at least one of A or B" may indicate all of 1) a case in which at least one A is included, 2) a case in which at least one B is included, or 3) a case in which both of at least one A and at least one B are included.

Expressions "first", "second", "$1^{st}$," "$2^{nd}$," or the like, used in the disclosure may indicate various components regardless of a sequence and/or importance of the components, will be used only in order to distinguish one component from the other components, and do not limit the corresponding components.

When it is mentioned that any component (for example: a first component) is (operatively or communicatively) coupled with/to or is connected to another component (for example: a second component), it is to be understood that any component is directly coupled to another component or may be coupled to another component through the other component (for example: a third component).

On the other hand, when it is mentioned that any component (for example, a first component) is "directly coupled" or "directly connected" to another component (for example, a second component), it is to be understood that the other component (for example, a third component) is not present between any component and another component.

An expression "~configured (or set) to" used in the disclosure may be replaced by an expression "suitable for," "having the capacity to," "~designed to," "~adapted to," "~made to," or "~capable of" depending on a situation. A term "~configured (or set) to" may not necessarily mean "specifically designed to" in hardware.

Instead, an expression "~an apparatus configured to" may mean that the apparatus "is capable of~" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In exemplary embodiments, a "module" or a "unit" may perform at least one function or operation, and be implemented by hardware or software or be implemented by a combination of hardware and software. In addition, a plurality of "modules" or a plurality of "~ers/ors" may be integrated in at least one module and be implemented by at least one processor except for a 'module' or an '~er/or' that needs to be implemented by specific hardware.

Meanwhile, various elements and regions in the drawings are schematically illustrated. Therefore, the spirit of the disclosure is not limited by relatively sizes or intervals illustrated in the accompanying drawings.

Hereinafter, embodiments of the disclosure will be described in detail with reference to the accompanying drawings so that those skilled in the art to which the disclosure pertains may easily practice the disclosure.

FIG. 1 is an exemplary view of a robot disembarking from an escalator.

An escalator is a stair-shaped structure or mechanical device designed to allow people, cargo, robots, etc., to automatically move between the travel spaces of different floors. The escalator can be divided into a descending escalator and an ascending escalator according to a movement direction.

A stair of the escalator may be referred to as a step or the like. In this case, the stair of each escalator may be implemented as a plurality of plates. Specifically, in this case, each stair may include a plate that performs a function of providing a space (or a space where an object or the like may be placed) where a person or a robot 100 may stand and a plate that performs a function of a frame supporting the stair. In this case, the plate performing the function of providing the space may be referred to as a step tread, a footrest, a stepping plate, etc., and the plate performing the function of the frame may be referred to as a step riser or the like.

The robot 100 according to one or more embodiments of the disclosure may be implemented as various electronic devices such as a robot capable of performing an operation of purifying air while traveling in a building space, a housekeeping support type robot capable of performing operations such as arranging clothes and washing dishes while traveling in a home space, or a security type robot capable of performing security while traveling in building space.

However, the robot 100 is not limited thereto, and may be implemented as a variety of movable robots. For example, the robot 100 may be implemented as a robot vacuum cleaner capable of performing a cleaning operation while traveling in a home space, an autonomous driving vehicle capable of performing a driving instead of a human, an automated guided vehicle capable of moving items to a destination, etc.

As illustrated in FIG. 1, with the recent development of driving technology, it is possible to set the traveling path of the robot 100 for the travel spaces 1 and 2 of different floors. In this case, the robot 100 may use a stair, an escalator, or the like to move between floors. For example, the robot 100 used in large marts, department stores, and the like may correspond to this.

However, in the case of the escalator 200, an accident in which the robot 100 collides with objects (e.g., a passenger, a pedestrian, etc.) around the robot 100 frequently occurs. In the case of a stair fixed to the ground, when there is a risk of a collision accident, the robot 100 may change its traveling path or stop traveling. However, in the case of the escalator 200, because the stair constituting the escalator 200 moves, even if the robot 100 is stationary, an accident in which the robot 100 collides with passengers around the robot 100 may occur.

In particular, such an accident occurs more frequently when the robot 100 gets off the escalator 200. In order to get off the escalator 200, there is a need to control the driver 120 of the robot 100 so that the robot 100 enters the disembarkment area 3 (e.g., waiting space) of the escalator 200. In this case, as illustrated in FIG. 1, when a passenger who got off earlier than the robot 100 is waiting at an exit or a pedestrian passes through the gate, if the robot 100 gets off the escalator 200 and continues to enter the disembarkment area 3, the robot 100 may have no choice but to collide with passengers or pedestrians existing in the disembarkment area 3.

On the other hand, the robot 100 may determine to wait on the escalator 200 until the passengers or pedestrians existing at the exit disappear. However, as the stair on which the robot 100 is located on the escalator 200 moves to the inside of the escalator 200 by a drive chain, the time for the robot 100 to wait on the escalator 200 may be inevitably small. Therefore, the robot 100 may have no choice but to enter the disembarkment area 3 inevitably, and as a result, a collision accident may occur.

In order to solve these problems, the disclosure accurately identifies whether the robot 100 is close to the disembarkment area 3 of the escalator 200, and when the robot 100 approaches the disembarkment area 3 of the escalator 200, it is identified whether objects (e.g., a person, another robot 100, an object, etc.) exists in the disembarkment area 3.

If an object is identified in the disembarkment area 3, the robot 100 identifies whether there is a risk of a collision accident between the identified object in the disembarkment area 3 and the robot 100, and when there is a risk of such a collision accident, the driver 120 is controlled to cause the robot to wait on the escalator 200. In this case, as the robot 100 moves in the opposite direction to the movement direction of the escalator 200 at the same speed as the movement speed of the escalator 200, the robot 100 may continue to wait on the escalator 200. To this end, the robot 100 of the disclosure also identifies the movement direction and movement speed of the robot 100 on the escalator 200. Hereinafter, an embodiment of the disclosure related to this will be described.

Figure 2:
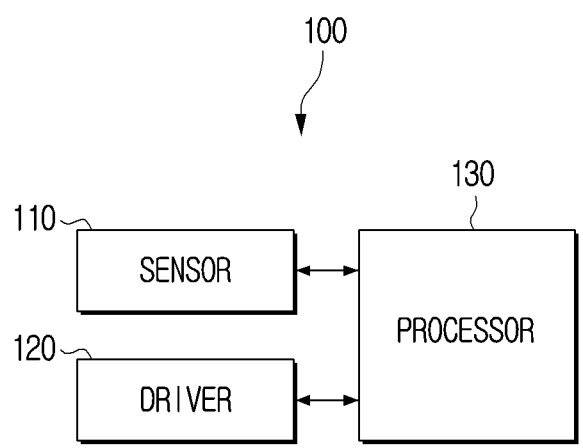
FIG. 2 is a schematic configuration diagram of a robot according to one or more embodiments of the disclosure.

FIG. 2 is a schematic configuration diagram of the robot 100 according to one or more embodiments of the disclosure.

According to FIG. 2, the robot 100 according to one or more embodiments of the disclosure includes at least one sensor 110, a driver 120, and a processor 130.

According to one or more embodiments of the disclosure, the robot 100 may be divided into a head and a body. For example, the head of the robot 100 may include the sensor 110 or a camera to perform a function of identifying an object around the robot 100 or acquiring an image of the object. The body of the robot 100 may be connected to the driver 120 to move the robot 100 or perform a function of a frame supporting the robot 100. The head may be connected to a rotatable motor or the like and attached to the body. Accordingly, the robot 100 may acquire an image of an object around the robot 100 by rotating the head 360° without controlling the driver 120.

However, the head and body of the robot 100 may be defined as terms for describing respective functions. That is, the robot 100 may be implemented as an integrated body in which the head and body are not distinguished, and in this case, the body and the head may be distinguished on the robot 100 according to the functions performed.

At least one sensor 110 detects an object around the robot 100. Specifically, at least one sensor 110 may identify a distance between an object around the robot 100 and the robot 100. To this end, at least one sensor 110 may be implemented as a light detection and ranging (Lidar) sensor, a time of flying sensor (ToF sensor), a complementary metal oxide semiconductor image sensor (CMOS image sensor), or the like.

In this case, the robot 100 may recognize objects around the robot 100 based on distance information between the robot 100 and objects around the robot 100 acquired through at least one sensor 110. For example, when at least one sensor 110 is implemented as the Lidar sensor, the Lidar sensor may rotate 360° to irradiate light, and identify the distance between the robot 100 and the object based on the time when the light is reflected and received through the object. In addition, the robot 100 identifies a point where the light is reflected as a point based on the intensity, time, etc. of the reflected and received light. In this case, the robot 100 may identify a plurality of clustered points among a plurality of identified points as a point cloud for an object. Also, the robot 100 may identify the type, size, location, etc., of the object based on the identified point cloud.

Meanwhile, according to one or more embodiments of the disclosure, the robot 100 may include a plurality of sensors 110. The plurality of sensors 110 may be provided on the head of the robot 100 and the body of the robot 100, respectively. In this case, the sensor 110 provided on the head of the robot 100 may be used to identify an object in front of the robot 100, and the sensor 110 provided on the body of the robot 100 may be used to identify an object below the robot 100. For example, the robot 100 may identify the distance between the object located in front of the robot 100 based on a sensing value acquired through the sensor 110 provided on the head of the robot 100. The robot 100 may acquire information on the stair of the escalator 200 while the robot 100 gets on the escalator 200 through the sensor 110 provided on the body of the robot 100. Here, the information on the stair may include a location of the stair of the escalator 200, a height difference between a plurality of adjacent stairs, and the like.

The driver 120 is a device capable of moving the robot 100. The driver 120 may adjust the traveling direction and the traveling speed under the control of the processor 130. The driver 120 according to an example may include a power generating device (e.g., a gasoline engine, a diesel engine, a liquefied petroleum gas (LPG) engine, an electric motor, etc. depending on fuel (or energy source) used) that generates power for the robot 100 to travel, and a steering device (e.g., manual steering, hydraulics steering, electronic control power steering (EPS), etc.) for controlling the traveling direction.

Meanwhile, according to one or more embodiments of the disclosure, the driver 120 may include a plurality of wheels. In this case, the plurality of wheels may perform a function of moving the robot 100 by rotating based on the control of the processor 130. Specifically, when receiving an electrical signal corresponding to control information (e.g., movement direction, movement speed, etc.) generated by the processor 130, the driver 120 may drive the power generating device and rotate the plurality of wheels, based on the received electrical signal. Accordingly, the robot 100 may move in a specific direction.

Alternatively, based on the control of the processor 130, the robot 100 may be rotated by rotating at least one of the plurality of wheels or by changing a rotation speed of the plurality of wheels. Specifically, when receiving an electrical signal corresponding to control information (e.g., rotation direction, rotation speed, etc.) generated by the processor 130, the driver 120 may drive the power generating device and rotate at least one of the plurality of wheels, based on the received electrical signal. Alternatively, the driver 120 may receive electrical signals of different magnitudes for each wheel and rotate each wheel at different speeds. Accordingly, the robot 100 may rotate or move in a specific direction.

Meanwhile, according to one or more embodiments of the disclosure, the robot 100 may further include a camera. The camera captures an object around the robot 100 and acquires a plurality of images of the object. Specifically, the camera may acquire images of a plurality of stairs of the escalator 200 or an object located in front of the robot 100 while the robot 100 is getting on the escalator 200. To this end, the camera may be implemented as an imaging device such as a CMOS image sensor (CIS) having a CMOS structure, a charge coupled device (CCD) having a CCD structure, or the like. However, the camera is not limited thereto, and the camera may be implemented as a camera module of various resolutions capable of capturing a subject.

Meanwhile, the camera may be implemented as a depth camera, a stereo camera, an RGB camera, or the like. Accordingly, the camera may acquire depth information of an object together with an image of the object.

The processor 130 may control a general operation of the robot 100. To this end, the processor 130 may include a random access memory (RAM), a read only memory (ROM), a central processing unit (CPU), a graphic processing unit (GPU), a system bus, and the like, and may execute calculations or data processing related to the control of one or more components included in the robot 100.

The processor 130 may control one or more components included in the robot 100 by executing one or more instructions stored in a storage, control one or more components as a hardware circuit or chip, or control one or more components as a combination of software and hardware.

The processor 130 may be electrically connected to various components in the robot 100 including at least one sensor 110, the driver 120, the camera, the communication unit, and the storage, and control these components.

Figure 3:
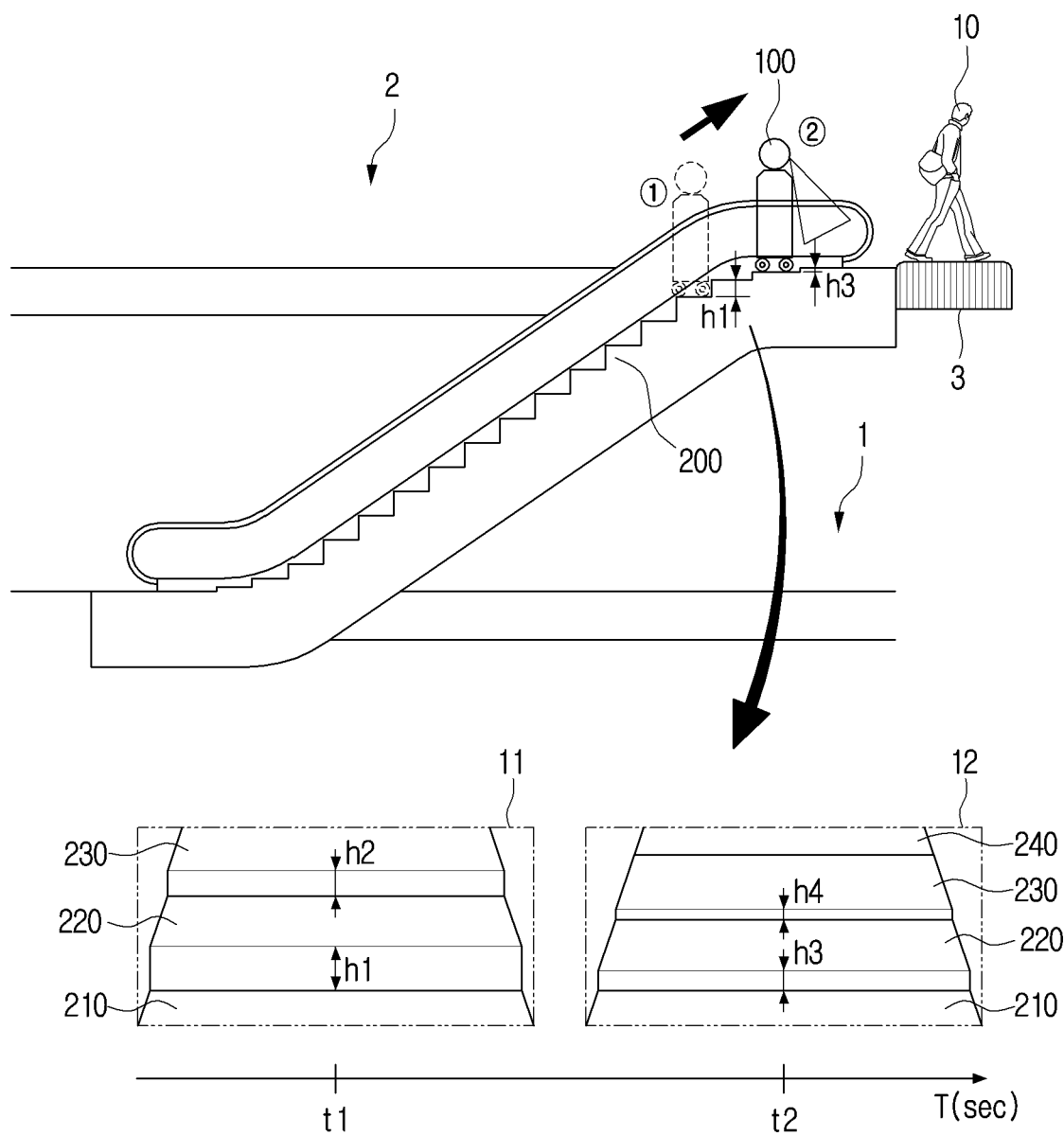
FIG. 3 is an exemplary diagram illustrating identifying a height difference between a plurality of stairs constituting an escalator and identifying a disembarkment area based on the identified height difference, according to one or more embodiments of the disclosure.

FIG. 3 is an exemplary diagram illustrating identifying a height difference between a plurality of stairs constituting an escalator and identifying a disembarkment area based on the identified height difference, according to one or more embodiments of the disclosure.

According to one or more embodiments of the disclosure, while the robot 100 is getting on the escalator 200, the processor 130 identifies a height difference between a first stair and a second stair of the escalator 200 through at least one sensor 110. In this case, the second stair may be a stair adjacent to the first stair in the escalator 200 in the movement direction of the escalator 200.

Specifically, the processor 130 may identify a height difference between a plurality of stairs of the escalator 200 through at least one sensor 110 after the robot 100 is on the escalator 200.

Referring to FIG. 3, the processor 130 may acquire sensing information on the plurality of stairs of the escalator 200 through at least one sensor 110 while the robot 100 is getting on the ascending escalator 200.

More specifically, the processor 130 may acquire a plurality of data 11 and 12 about the escalator 200 through at least one sensor 110. Specifically, the processor 130 may acquire first sensing data 11 for the escalator 200 at time t1 and acquire second sensing data 12 for the escalator 200 at time t2.

In this case, the processor 130 may identify the height difference between the plurality of stairs based on the first data 11 and the second data 12. Specifically, the processor 130 may identify, as h1, a height difference between a stair 210 where the robot 100 is located and another stair 220 adjacent to the stair where the robot 100 is located in the movement direction of the escalator 200 based on the first data 11. The processor 130 may identify, as h3, a height difference between a stair 210 where the robot 100 is located and another stair 220 adjacent to the stair where the robot 100 is located in the movement direction of the escalator 200 based on the second data 12.

In addition, the processor 130 may identify, as h2, a height difference between a stair 220 adjacent to the stair 210 where the robot 100 is located and a stair 230 located in front of the stair 210 based on the first data 11. The processor 130 may identify, as h4, a height difference between a stair 220 adjacent to the stair 210 where the robot 100 is located and the stair 230 located in front of the stair 210 based on the second data 12. As such, the processor 130 may identify a height difference between a plurality of adjacent stairs of the escalator 200 in real time based on the sensing data acquired for the stair of the escalator 200.

Meanwhile, the processor 130 may identify that the robot 100 is getting on the escalator 200 when detecting that the location of the robot 100 is changed without the control of the driver 120. Alternatively, the processor 130 may identify whether the robot 100 is getting on the escalator 200 based on map data stored in a memory of the robot 100. The processor 130 may identify a real-time location of the robot 100 and the location of the escalator 200 based on the map data. The processor 130 may identify that the robot 100 is getting on the escalator 200 when it is identified that the robot 100 is located on the escalator 200 based on the map data.

Meanwhile, the map data is map data including information on a travel space set for the robot 100 to travel. The information on the travel space includes a traveling path of the robot 100 set in the travel space, location information such as a structure (e.g., escalator 200), a terrain, and an obstacle in the travel space, or the like.

FIG. 3 shows that the sensing information is acquired in the form of the image, but this is for convenience of description of the present disclosure, and the sensing information may be acquired in various forms (e.g., values, images, point cloud, etc.) according to the type of at least one sensor 110.

According to one or more embodiments of the disclosure, the processor 130 may identify whether the robot 100 is adjacent to the disembarkment area 3 of the escalator 200 based on the identified height difference between the first stair and the second stair.

Specifically, the processor 130 may identify that the robot 100 is adjacent to the disembarkment area 3 of the escalator 200 when the identified height difference between the first stair and the second stair is less than a predetermined value.

Here, the disembarkment area 3 means an area where a passenger (e.g., a person, a robot 100, etc.) who gets on the escalator 200 lands or waits after getting off the stair of the escalator 200. For example, the disembarkment area 3 may include a platform step installed at the exit of the escalator 200.

The disembarkment area 3 may further include a ground around the exit of the escalator 200. For example, the disembarkment area 3 may include the platform step installed at the exit of the escalator 200 and may further include a ground within a predetermined range around the platform step.

The processor 130 may identify whether the robot 100 is adjacent to the disembarkment area 3 based on the identified height difference between the first stair and the second stair. Specifically, because the robot 100 moves through the travel spaces 1 and 2 of different floors through the escalator 200, errors may occur in the map data used by the processor 130 to identify the location of the robot 100.

For example, when the map data for the travel spaces 1 and 2 of different floors are stored in the robot 100, the processor 130 may use different map data according to the floor of the travel space where the robot 100 is located. In this case, when the time (e.g., the time when the floor of the travel space where the robot 100 is located is changed) at which the location of the robot 100 is changed is unclear, the processor 130 may use map data (e.g., map data of a travel space on a floor other than the travel space where the robot 100 is located) different from the travel space where the robot 100 is located. Accordingly, the processor 130 may not also accurately identify the location of the disembarkment area 3 of the escalator 200 as well as the location of the robot 100.

Therefore, according to one or more embodiments of the disclosure, while the robot 100 is getting on the escalator 200, the processor 130 identifies that the robot 100 is adjacent to the disembarkment area 3 of the escalator 200 based on the height difference between the plurality of adjacent stairs of the escalator 200 rather than the map data.

Referring back to FIG. 3, the processor 130 may identify that the height difference between the stair 210 where the robot 100 is located and another stair 220 adjacent to the stair where the robot 100 is located in the movement direction of the escalator 200 decreases. Specifically, the processor 130 may identify that a height difference between the stair 210 where the robot 100 is located and another stair 220 adjacent to the stair where the robot 100 is located in the movement direction of the escalator 200 decreases from h1 to h3 as the time elapses (that is, as the time elapses from t1 to t2). In this case, when it is assumed that the predetermined value is h3, the processor 130 may identify that the robot 100 is adjacent to the disembarkment area 3 at time t2. Meanwhile, according to one or more embodiments of the disclosure, the predetermined value may be set to "0."

According to one or more embodiments of the disclosure, the processor 130 may select a plurality of target stairs for identifying a height difference between stairs among the plurality of stairs of the escalator 200 while the robot 100 is getting on the escalator 200. That is, the processor 130 may select the plurality of target stairs that are criteria for determining whether the robot 100 is adjacent to the disembarkment area 3.

Specifically, referring back to FIG. 3, the processor 130 may identify whether the robot 100 is adjacent to the disembarkment area 3 based on the height differences (e.g., h1 and h3) between the stair 210 where the robot 100 is located and the stair 220 adjacent to the stair where the robot 100 is located. That is, the processor 130 may select the stair where the robot 100 is located and the stair adjacent to the stair where the robot 100 is located as the target stairs.

Alternatively, the processor 130 may identify whether the robot 100 is adjacent to the disembarkment area 3 based on the height differences (e.g., h2 and h4) between the stair 220 adjacent to the stair where the robot 100 is located and the stair 230 located in front of the stair 220. That is, the processor 130 may select a stair adjacent to the stair where the robot 100 is located and a stair located in front thereof as the target stairs.

In this way, the processor 130 may select the target stairs among the plurality of stairs of the escalator 200, and identify only the height difference between the selected target stairs, thereby more quickly and accurately determining whether the robot 100 is adjacent to the disembarkment area 3.

In this case, the processor 130 may select the target stair based on the movement speed of the escalator 200. When the movement speed of the escalator 200 is less than the predetermined speed, the processor 130 may select the stair where the robot 100 is located and the stair adjacent to the stair where the robot 100 is located as the target stairs. In addition, when the movement speed of the escalator 200 is equal to or more than the predetermined speed, the processor 130 may select a stair adjacent to the stair where the robot 100 is located and a stair in front thereof as the target stairs.

The heights of the first stair and the second stair may be identified within a predetermined 3D coordinate space 300. This will be described in detail in FIGS. 4 and 5.

Figure 4:
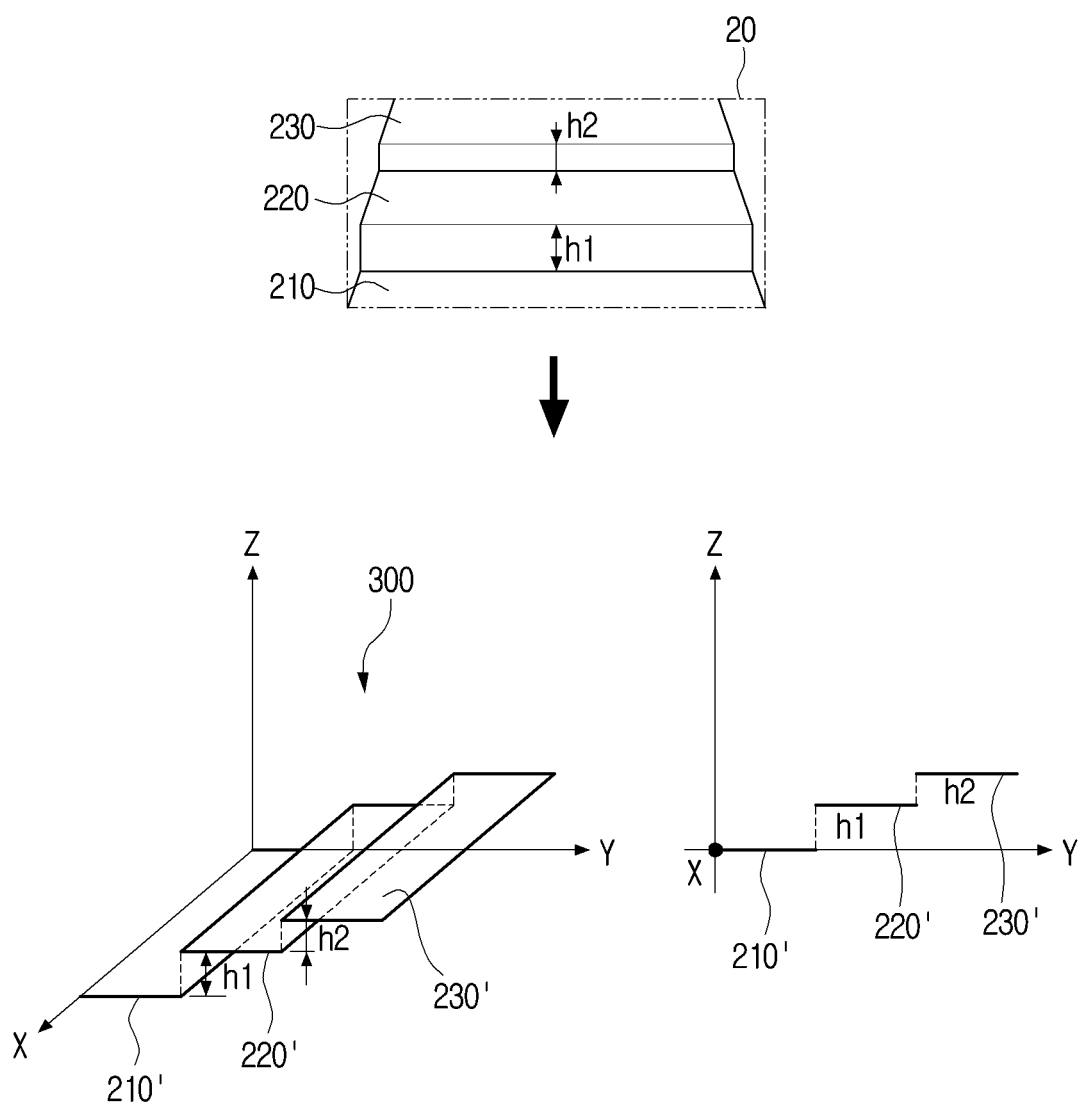
FIG. 4 is an exemplary diagram illustrating identifying a height difference between a plurality of stairs of an ascending escalator according to one or more embodiments of the disclosure.
Figure 5:
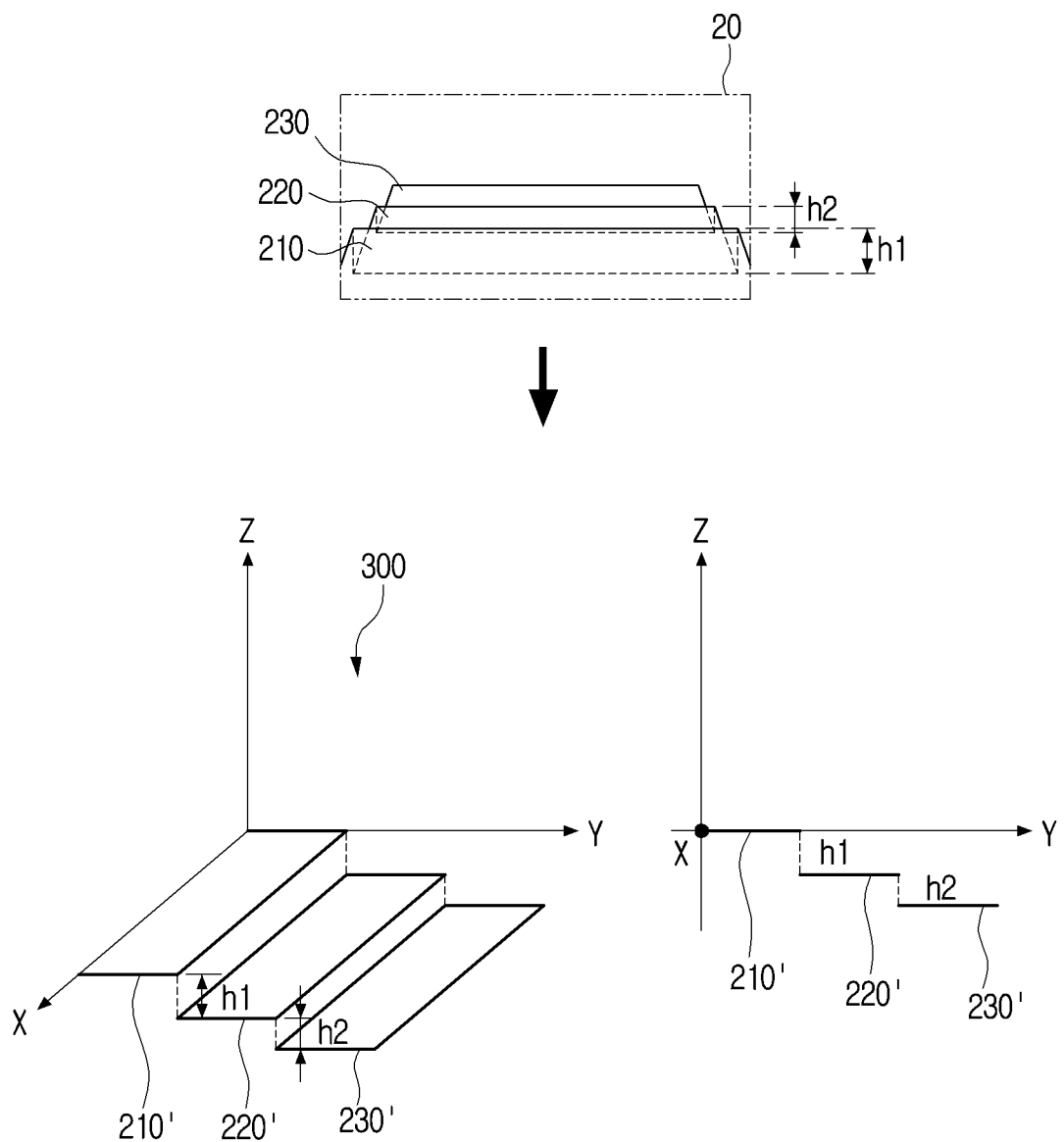
FIG. 5 is an exemplary diagram illustrating identification of a height difference between a plurality of stairs of a descending escalator according to one or more embodiments of the disclosure.

FIG. 4 is an exemplary diagram illustrating identification of a height difference between a plurality of stairs of an ascending escalator according to one or more embodiments of the disclosure. FIG. 5 is an exemplary diagram illustrating identification of a height difference between a plurality of stairs of a descending escalator according to one or more embodiments of the disclosure.

The processor 130 may identify relative heights of the plurality of stairs of the escalator 200 based on the robot 100 or the stair on which the robot 100 is located. Specifically, the processor 130 may identify each of the plurality of stairs identified through at least one sensor 110 within the predetermined 3D coordinate space 300. In this case, the locations of each stair may be relatively identified based on the location of at least one sensor 110 of the robot 100 or relatively identified based on the location of the stair on which the robot 100 is located. The processor 130 may compare the relative locations of each identified stair within the predetermined 3D coordinate space 300. As a result, the processor 130 may identify the height difference between each stair.

In this case, the processor 130 may identify step treads of each stair within the predetermined 3D coordinate space 300 based on the sensing data of the step treads of each stair. The processor 130 may identify a height difference between a plurality of adjacent stairs based on a z-coordinate value of 3D coordinates of the step treads of each stair.

In addition, the processor 130 may identify step risers of each stair within the predetermined 3D coordinate space 300 based on the sensing data of the step risers of each stair. The processor 130 may identify a height difference between a plurality of adjacent stairs based on the height information of the step risers of each stair. In this case, the height information of the step riser may be length information of the step riser identified in the 3D coordinate space 300 in a z-axis direction.

However, the disclosure is not limited thereto, and the processor 130 may identify the height difference between the plurality of adjacent stairs by combining the location information of the step treads of each stair in the 3D coordinate space 300 and the height information of the step risers.

As an example, the processor 130 may acquire cloud data for the plurality of stairs of the escalator 200 through a Lidar sensor. In this case, the plurality of stairs are stairs included in the sensing range of the Lidar sensor. Meanwhile, the processor 130 may identify a set of clustered points corresponding to each stair based on the cloud data. In this case, the processor 130 may identify a set of clustered points corresponding to each stair based on a random sample consensus (RANSAC) technique, a principal component analysis technique, and the like. The processor 130 may also acquire only data (e.g., point cloud data corresponding to the step tread) for the step tread of each stair in order to compare the locations of each stair.

Referring to FIG. 4, while the robot 100 is getting on the ascending escalator 200, the processor 130 may identify a plurality of stairs 210', 220', and 230' based on the sensing data 20 acquired through at least one sensor 110. The processor 130 identifies each of the plurality of stairs 210, 220, and 230 identified through the sensing data 20 on a predetermined 3D spatial coordinate space. The processor 130 identifies the locations of each stair 210', 220', and 230' identified on the 3D spatial coordinate space, and identifies the height difference between each stair. Referring to FIG. 4, the processor 130 may identify, as h1, the height difference between the stair where the robot 100 is located and the stair adjacent to the stair where the robot 100 is located in the movement direction of the escalator 200. In addition, the processor 130 may identify, as h2, the height difference between a stair adjacent to a stair where the robot 100 is located in the movement direction of the escalator 200 and a stair located in front the stair (e.g., the movement direction of the escalator 200).

Similarly, the processor 130 may identify a height difference between a plurality of adjacent stairs even while the robot 100 is getting on the descending escalator 200. Referring to FIG. 5, while the robot 100 is getting on the descending escalator 200, the processor 130 may identify the plurality of stairs 210, 220, and 230 based on the sensing data 20 acquired through at least one sensor 110. The processor 130 may identify each of the plurality of stairs 210, 220, and 230 identified through the sensing data 20 on the predetermined 3D spatial coordinate space. The processor 130 may identify the locations of each stair 210', 220', and 230' identified on the 3D spatial coordinate space. In this case, when it is assumed that the stair 210 among the plurality of stairs is the stair where the robot 100 is located, the z coordinate value representing the location of the remaining stairs 220 and 230 on the 3D coordinate space 300 may be a negative number. In this case, the processor 130 may identify the height difference between the plurality of adjacent stairs by comparing absolute values of coordinate values of each stair.

Figure 6:
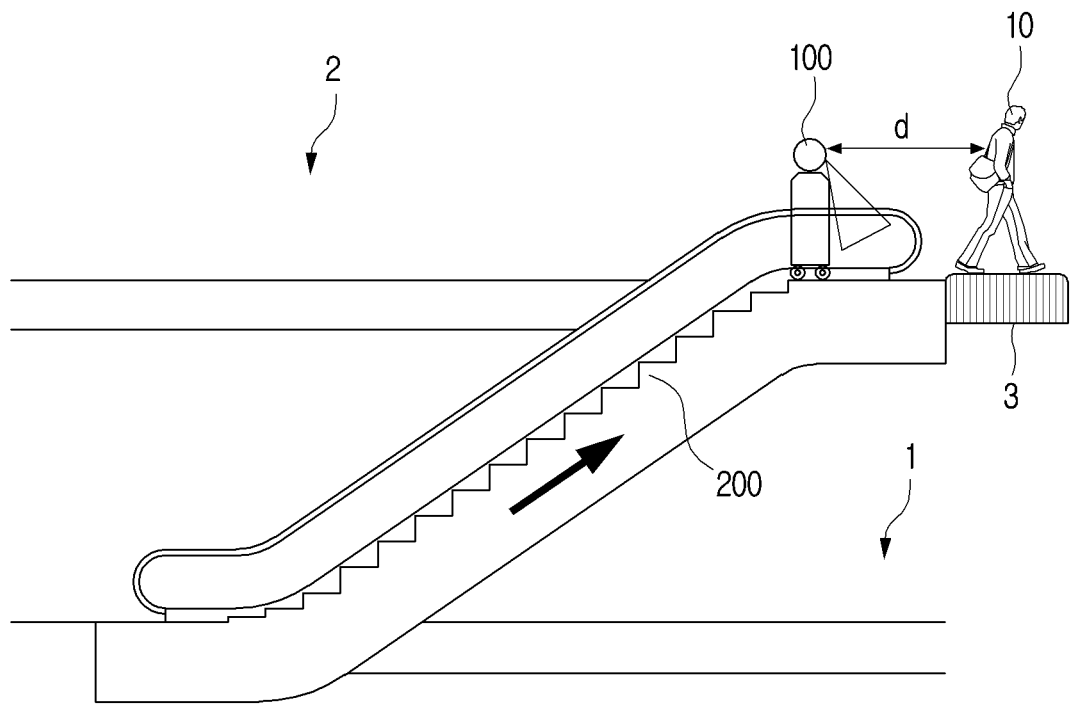
FIG. 6 is an exemplary diagram illustrating a method of controlling a robot based on a distance to an object within a disembarkment area according to one or more embodiments of the disclosure.
Figure 6:
Figure 6:
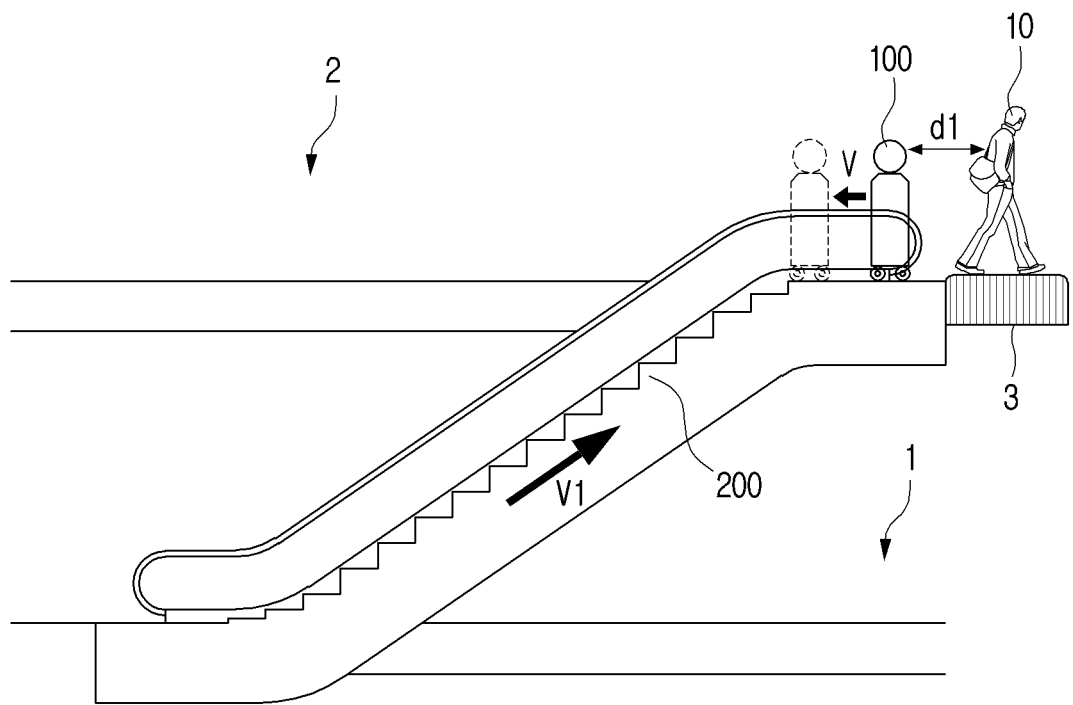

FIG. 6 is an exemplary diagram illustrating a method of controlling a robot based on a distance to an object within a disembarkment area according to one or more embodiments of the disclosure.

According to one or more embodiments of the disclosure, when it is identified that the robot 100 is adjacent to the disembarkment area 3 of the escalator 200, the processor 130 may identify an object located in front of the robot 100 through at least one sensor 110.

Specifically, when it is identified that the robot 100 is adjacent to the disembarkment area 3 of the escalator 200 based on the height difference between the plurality of adjacent stairs, the processor 130 may identify the object 10 located in front of the robot 100 through at least one sensor 110.

For example, when the height difference between the plurality of adjacent stairs of the escalator 200 is identified based on the sensing data acquired through the sensor 110 provided on the body of the robot 100, and when it is identified that the robot 100 is adjacent to the disembarkment area 3 of the escalator 200 based on the identified height difference, the processor 130 may identify the object 10 located in front of the robot 100 through the sensor 110 provided on the head.

In this case, the front of the robot 100 may include a predetermined range based on the movement direction of the escalator 200. That is, the front of the robot 100 may include a predetermined range in which a collision between the robot 100 and an object may occur when the robot 100 gets off in a direction consistent with the movement direction of the escalator 200.

As a result, the processor 130 may identify whether the object 10 exists in the disembarkment area 3 of the escalator 200 or in a location adjacent to the disembarkment area 3 immediately before the robot 100 gets off. In particular, the processor 130 may identify whether the robot 100 is adjacent to the disembarkment area 3 of the escalator 200 through the height difference between the plurality of adjacent stairs of the escalator 200, and thus, even if a communication failure occurs with an external server that transmits the location information of the robot 100 or errors occur in the map data used to identify the location of the robot 100, the processor may accurately identify the communication failure or errors.

According to one or more embodiments of the disclosure, when the distance between the object 10 identified as being located in front of the robot 100 and the robot 100 is less than a predetermined first distance, the processor 130 controls the driver 120 so that the robot 100 moves on the escalator 200 in the direction opposite to the movement direction of the escalator 200.

Specifically, the processor 130 may identify the distance between the robot 100 and the object 10 identified as being located in front of the robot 100 through at least one sensor 110 in real time. According to one or more embodiments of the disclosure, when the distance between the object 10 located in front of the robot 100 and the robot 100 is less than the predetermined first distance, the processor 130 may control the driver 120 so that the robot 100 moves on the escalator 200 in the direction opposite to the movement direction of the escalator 200. For example, the processor 130 may control the plurality of wheels of the driver 120 to rotate in the direction opposite to the movement direction of the escalator 200. Accordingly, when there is an object 10 that may collide with the robot 100, the processor 130 may control the robot 100 not to get off the escalator 200.

The predetermined first distance may be set based on the movement speed of the escalator 200. For example, when the movement speed is greater than or equal to the predetermined speed, the first distance may be set as a first value, and when the movement speed is less than the predetermined speed, the first distance may be set as a second value smaller than the first value. That is, when the movement speed of the escalator 200 is fast, the movement speed of the robot 100 entering the disembarkment area 3 after getting off the escalator 200 may also be fast, so the collision accident between the object 10 and the robot 100 may occur more frequently. Therefore, when the movement speed of the escalator 200 is fast, it is possible to prevent the collision accident by setting the predetermined first distance to a longer distance.

Referring to FIG. 6, when it is identified that the robot 100 is adjacent to the disembarkment area 3, the processor 130 identifies a distance d between the robot 100 and the object 10 located in front of the robot 100. In this case, when the distance d between the robot 100 and the object 10 located in front of the robot 100 is identified as d1 (e.g., less than the predetermined distance), the processor 130 may control the driver 120 so that the robot 100 moves on the escalator 200 in the direction opposite to the movement direction of the escalator 200. Accordingly, the robot 100 may wait on the escalator 200 when there is a risk of collision with an object.

In this case, according to the embodiment of the predetermined disclosure, the processor 130 may control the driver 120 so that the robot 100 moves in the direction opposite to the movement direction of the escalator 200 at the movement speed of the escalator 200.

Specifically, the processor 130 may control the driver 120 so that the robot 100 moves in the opposite direction to the disembarkment direction at the same speed as the movement speed of the escalator 200 in the identified disembarkment area 3. Accordingly, the robot 100 may maintain a constant position on the escalator 200. This may exert the same effect as if a person walks in place on the escalator 200.

Referring back to FIG. 6, the processor 130 may control the driver 120 so that the robot 100 moves in the direction opposite to the movement direction of the escalator 200 at the same speed as a movement speed v1 of the escalator 200. Accordingly, the robot 100 may maintain a constant position on the escalator 200.

According to one or more embodiments of the present disclosure, while the robot 100 moves in the direction opposite to the movement direction of the escalator 200, when it is identified that there is no object 10 in front of the robot 100 through at least one sensor 110, the processor 130 may control the driver 120 to move the robot 100 according to the movement direction of the escalator 200, and control the robot 100 to get off the escalator 200 and enter the disembarkment area 3.

Specifically, the processor 130 continuously identifies whether the object 10 located in front of the robot 100 exists while the robot 100 moves in the direction opposite to the movement direction of the escalator 200. When it is identified that the object 10 does not exist in front of the robot 100, the plurality of wheels of the driver 120 may be controlled to allow the robot 100 to get off the escalator 200 according to the movement direction of the escalator 200. In this case, the rotation direction of the plurality of wheels may coincide with the movement direction of the escalator 200. As a result, the robot 100 may enter the disembarkment area 3 of the escalator 200 after getting off the escalator 200.

Also, the processor 130 may continue to identify the distance between the robot 100 and the object 10 located at a distance less than the first distance. In this case, when the object 10 located at the distance less than the first distance disappears from the front of the robot 100 or moves away from the robot 100, the processor 130 may control the plurality of wheels of the driver 120 so that the robot 100 gets off the escalator 200 in the movement direction of the escalator 200.

The processor 130 may identify whether an object exists in the disembarkment area 3 based on the image acquired through the camera. That is, when it is identified that the robot 100 is adjacent to the disembarkment area 3 of the escalator 200 based on the height difference between the plurality of adjacent stairs of the escalator 200, the processor may acquire an image of an object located in front of the robot 100 through the camera provided in the head of the robot 100. In this case, the depth information of the object may be included in the acquired image. Accordingly, the processor 130 may identify the distance between the robot 100 and the object based on the depth information.

Figure 7:
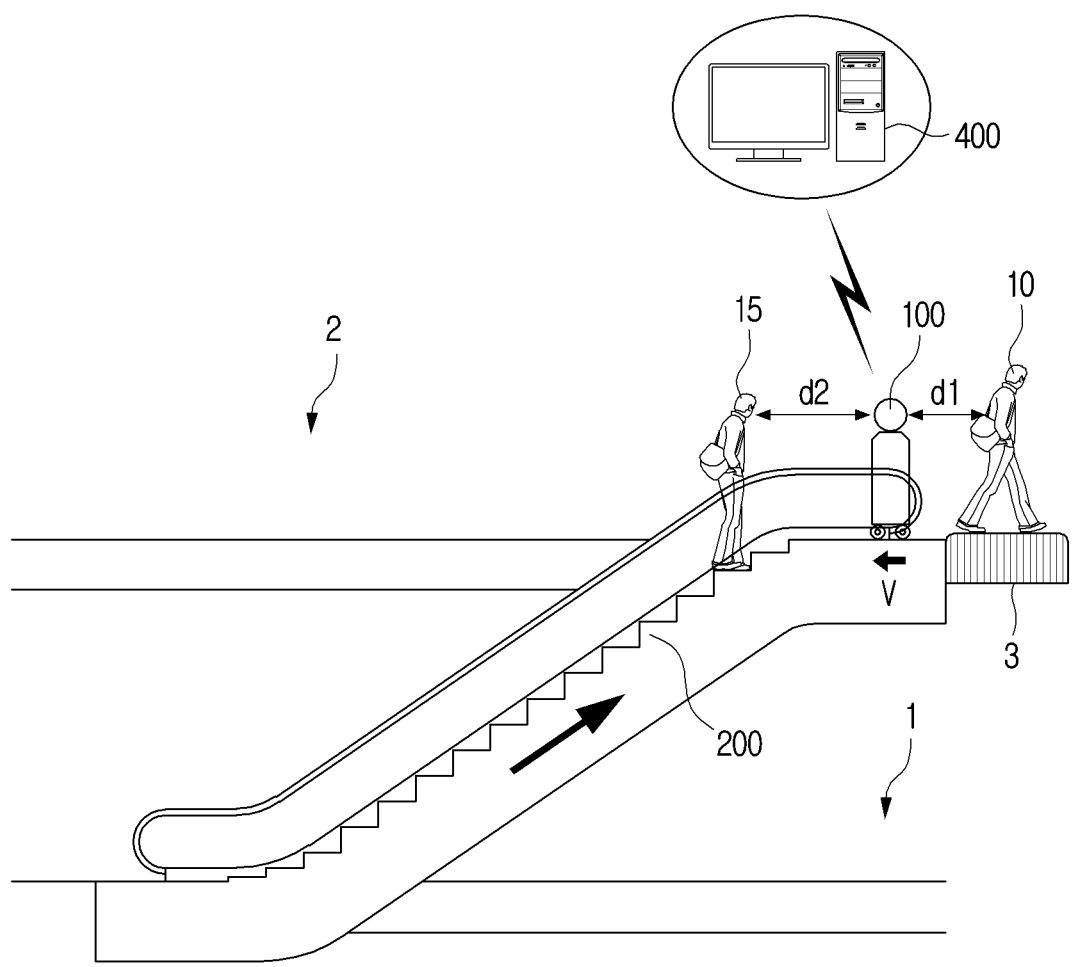
FIG. 7 is an exemplary diagram illustrating the method of controlling a robot when an object exists in front of and behind the robot according to one or more embodiments of the disclosure.

FIG. 7 is an exemplary diagram illustrating the method of controlling a robot when an object exists in front of and behind the robot according to one or more embodiments of the disclosure.

Meanwhile, according to one or more embodiments of the disclosure, while the robot 100 moves in the direction opposite to the movement direction of the escalator 200, the processor 130 may identify whether an object 15 located behind the robot 100 exists through at least one sensor 110, and when the distance between the object 15 identified behind the robot 100 and the robot 100 is less than the predetermined distance, the processor 130 may transmit the control signal for stopping the escalator 200 to the server 400 through the communication interface of the robot 100. To this end, the robot 100 according to one or more embodiments of the disclosure may further include a communication interface.

Referring to FIG. 7, while the robot 100 moves in the direction opposite to the movement direction of the escalator 200 as the distance between the object 10 existing in front of the robot 100 and the robot 100 is identified as being less than the predetermined first distance, the processor 130 identifies whether the object 15 located behind the robot 100 exists through at least one sensor 110. In this case, the object 15 located behind the robot 100 includes a passenger (e.g., a person, animal, robot 100, etc.) getting on the escalator 200 and an object (e.g., object, food, etc.) mounted on the escalator 200.

As an example, the processor 130 may identify whether the object 15 located behind the robot 100 exists through the sensor 110 provided on the head of the robot 100. For example, while the robot 100 moves in the direction opposite to the movement direction of the escalator 200, the processor 130 may rotate the head of the robot 100 by 180° to identify the object 15 located behind the robot 100 through the sensor 110 provided on the head of the robot 100. However, the disclosure is not limited thereto, and another sensor 110 may be provided on the front and rear sides of the head or body of the robot 100, respectively.

The processor 130 may identify a distance between another (second) object 15 located behind the robot 100 and the robot 100. When the distance between another object 15 located behind the robot 100 and the robot 100 is within d2 as a predetermined distance (e.g., predetermined second distance), the processor 130 may transmit a signal requesting to stop the escalator 200 to the external server 400 controlling the escalator 200 through the communication interface of the robot 100. Alternatively, the processor 130 may directly transmit a control signal to stop the operation of the escalator 200 to the escalator 200 through the communication interface.

While the processor 130 controls the robot 100 to wait on the escalator 200 in order to avoid a collision with the object 10 located in front of the robot 100, the processor identifies the passenger 15 moving toward the robot 100 from the rear of the robot 100 according to the driving of the escalator 200. In order to prevent another collision between the robot 100 and the passenger 15 moving from the rear of the robot 100, when it is identified that the distance between the passenger located behind the robot 100 and the robot 100 is less than the predetermined distance, the processor 130 may request the external server 400 (e.g., control management server of the escalator) to stop the escalator 200.

Figure 8:
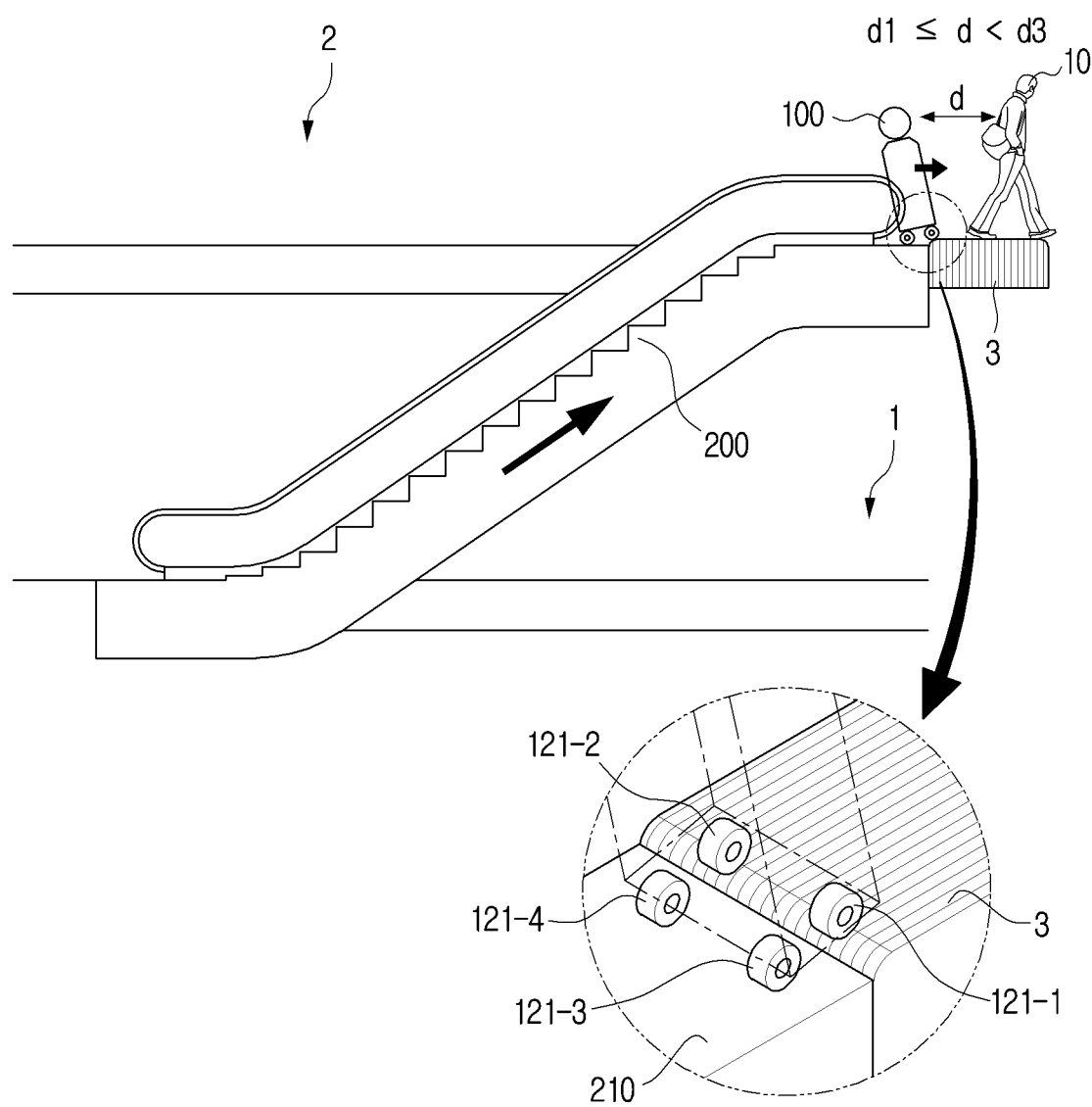
FIG. 8 is an exemplary diagram illustrating a method of controlling a plurality of wheels of a robot based on a distance to an object within a disembarkment area according to one or more embodiments of the disclosure.

FIG. 8 is an exemplary diagram illustrating a method of controlling a plurality of wheels of a robot based on a distance to an object within a disembarkment area according to one or more embodiments of the disclosure.

According to one or more embodiments of the disclosure, while the robot 100 moves in the direction opposite to the movement direction of the escalator 200, when the distance between the object and the robot 100 is equal to or greater than the predetermined first distance and less than the predetermined third distance as the object identified as being located in front of the robot 100 moves, the processor 130 may control the driver 120 so that at least one of the plurality of wheels is located within the disembarkment area 3 and the remaining wheels are located on the escalator 200. The processor 130 may control the driver 120 so that the remaining wheels rotate in the direction opposite to the movement direction of the escalator 200 while the remaining wheels are located on the escalator 200.

First, while the robot 100 moves in the direction opposite to the movement direction of the escalator 200, the processor 130 may continuously identify the distance between the object identified as being located in front of the robot 100 and the robot 100. When the distance between the object and the robot 100 is equal to or more than the predetermined first distance and greater than the predetermined third distance as the object located in front of the robot 100 moves, the processor 130 may control the driver 120 so that the robot 100 enters the disembarkment area 3 of the escalator 200 according to the movement direction of the escalator 200. That is, the processor 130 may control the robot 100 to enter the disembarkment area 3 by rotating the plurality of wheels of the driver 120 in the movement direction of the escalator 200.

In this case, as the robot 100 enters the disembarkment area 3, the processor 130 allows at least one of a plurality of wheels of the driver 120 to be located within the disembarkment area 3 and allows the remaining wheels except for at least one wheel located within the disembarkment area 3 among the plurality of wheels to be on the escalator 200. To this end, the processor 130 may identify that at least one wheel is located in the disembarkment area 3 based on the amount of impact (e.g., the amount of shock absorbed by the suspension of at least one wheel as at least one wheel enters the disembarkment area 3) transmitted to a suspension of at least one wheel connecting at least one wheel and the robot 100.

To this end, the processor 130 may identify the movement speed of the robot 100 at which at least one of the plurality of wheels may be located in the disembarkment area 3 based on the movement speed of the escalator 200, and may identify the moving distance of the robot 100 allowing at least one wheel to be located in the disembarkment area 3 based on the distance between the disembarkment area 3 and the robot 100. In this case, the distance between the disembarkment area 3 and the robot 100 may be acquired through at least one sensor 110.

At least one wheel located in the disembarkment area 3 may be at least one wheel located in the movement direction of the escalator 200 among the plurality of wheels. For example, at least one wheel located in the disembarkment area 3 may be a wheel located in front of the robot 100 or in the movement direction of the escalator 200 among a plurality of wheels attached to the body of the robot 100.

The processor 130 may control the driver 120 so that the remaining wheels rotate in the direction opposite to the movement direction of the escalator 200 while the remaining wheels are located on the escalator 200.

That is, the processor 130 controls the driver 120 to rotate the plurality of wheels in the same direction as the movement direction of the escalator 200, and thus, when at least one of the plurality of wheels is located within the disembarkment area 3, may control the driver 120 so that the remaining wheels except for at least one wheel located within the disembarkment area 3 among the plurality of wheels move in the direction opposite to the movement direction of the escalator 200.

For example, referring to FIG. 8, when the distance between the robot 100 and the object identified as existing in front of the robot 100 is equal to or more than the predetermined first distance d1 and less than the predetermined third distance d3, the processor 130 controls the driver 120 to rotate the four wheels 121-1 to 121-4 included in the driver 120 in the movement direction of the escalator 200. When two wheels 121-1 and 121-2 located in the movement direction or in front of the escalator 200 among the four wheels are identified as being located in the disembarkment area 3, the processor controls the driver 120 to rotate the remaining two wheels 121-3 and 121-4 located on the escalator 200 in the direction opposite to the movement direction of the escalator 200.

Accordingly, while only one portion of the robot 100 is located in the escalator 200, the robot 100 may wait until the object located in front of the robot 100 disappears or the distance between the robot 100 and the object becomes more than a predetermined third distance.

While FIG. 8 illustrates that the robot 100 of the disclosure includes four wheels 121-1 to 121-4, but this is for convenience of explanation of the disclosure, and the robot 100 of the disclosure may include various numbers of wheels depending on the embodiment.

Hereinafter, a method of identifying a movement speed and movement direction of an escalator 200 according to one or more embodiments of the disclosure will be described. Meanwhile, an embodiment of identifying the movement speed and movement direction of the escalator 200 described below may be equally applied to the above-described embodiment of the disclosure.

Figure 9:
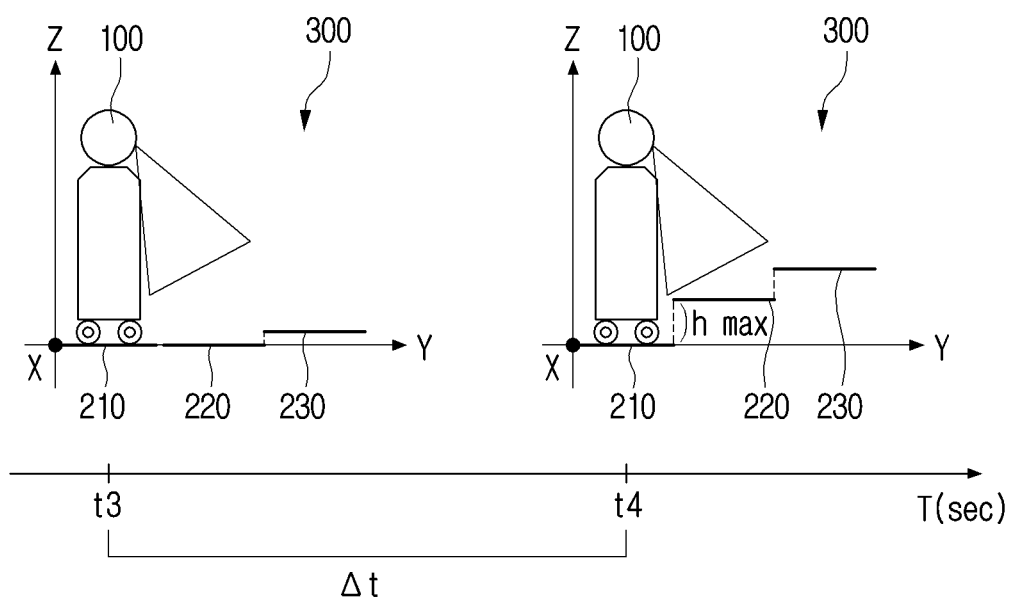
FIG. 9 is an exemplary diagram illustrating a method of identifying a speed of an escalator based on a height difference between a plurality of stairs of an escalator according to one or more embodiments of the disclosure.

FIG. 9 is an exemplary diagram illustrating a method of identifying a speed of an escalator based on a height difference between a plurality of stairs of an escalator according to one or more embodiments of the disclosure.

According to one or more embodiments of the disclosure, when the robot 100 gets on the escalator 200, the processor 130 may identify the third stair in the escalator 200 and the fourth stair adjacent to the movement direction of the escalator 200, and identify the movement speed of the escalator 200 based on the time when the height difference between the third stair and the fourth stair is maximized from the time when the height difference between the third stair and the fourth stair occurs according to the movement of the escalator 200.

Specifically, the processor 130 may identify the third and fourth stairs of the escalator 200 through at least one sensor 110 when the robot 100 is getting on the escalator 200. For example, as the robot 100 gets on the escalator 200, the processor 130 may identify the stair where the robot 100 is located as the third stair, and the stair adjacent to the stair where the robot 100 is located in the movement direction of the escalator 200 as the fourth stair.

In this case, the processor 130 identifies the third stair and the fourth stair on the 3D coordinate space 300 based on the sensing information acquired through at least one sensor 110. The processor 130 identifies the locations of the third stair and the fourth stair on the three-dimensional coordinate space 300, and identifies the time when the height difference between the third stair and the fourth stair occurs. As an example, referring to FIG. 9, at time t3 when the robot 100 gets on the escalator 200, there may be no height difference between the stair where the robot 100 is located and the stair adjacent to the stair in the movement direction of the escalator 200. That is, the third stair and the fourth stair have the same z-coordinate value, and thus may be located at the same height. The processor 130 may identify the time when the height difference between the third stair and the fourth stair becomes maximum. As the robot 100 moves on the escalator 200, the processor 130 may identify a time point t4 when the increasing height difference between the third stair and the fourth stair becomes maximum. In this case, the processor 130 may identify that the height difference between the third stair and the fourth stair is maximum when the height difference between the third stair and the fourth stair does not increase any more.

In this case, the robot 100 may identify the movement speed of the escalator 200 based on a time Δt elapsed from time t3 when the height difference between the third stair and the fourth stair occurred to the time t4 when the height difference between the third stair and the fourth stair becomes maximized. For example, the robot 100 may also identify the movement speed of the escalator 200 based on the maximum value of the height difference between the third stair and the fourth stair and the identified required time.

Figure 10:
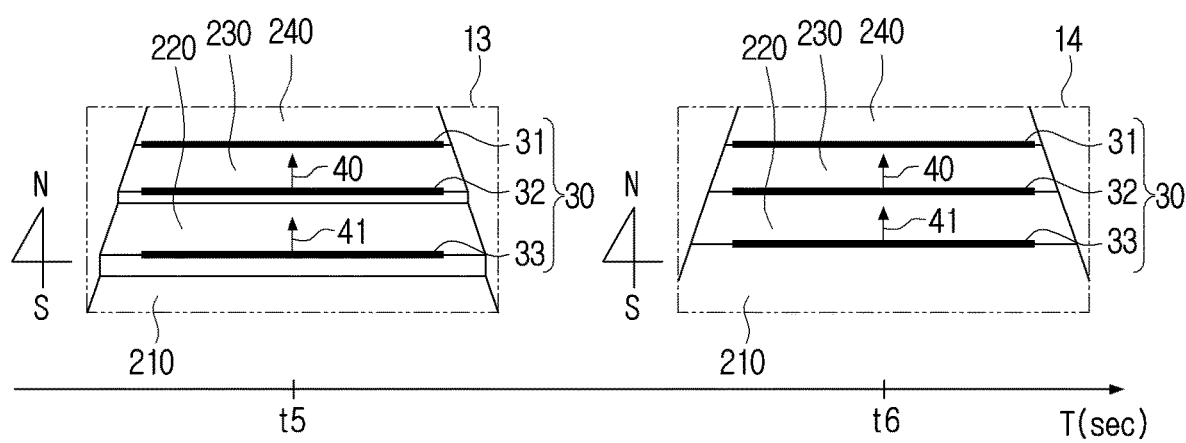
FIG. 10 is an exemplary diagram illustrating a method of identifying a speed of an escalator based on an acquired image of an escalator according to one or more embodiments of the disclosure.

FIG. 10 is an exemplary diagram illustrating a method of identifying a speed of an escalator based on an acquired image of an escalator according to one or more embodiments of the disclosure.

According to one or more embodiments of the disclosure, the processor 130 may acquire a plurality of images of the escalator 200 through the camera of the robot 100, identify the boundary line 30 between the first stair and the second stair based on the acquired image when it is identified that the robot 100 is adjacent to the disembarkment area 3 of the escalator 200, and identify the movement speed of the escalator 200 based on the movement speed of the identified boundary line 30. To this end, the robot 100 according to one or more embodiments of the disclosure may further include the camera.

Specifically, when it is identified that the robot 100 is adjacent to the disembarkment area 3, the processor 130 may acquire the plurality of images of the stairs of the escalator 200 through the camera, and identify the boundary line 30 between the plurality of stairs of the escalator 200 based on the plurality of acquired images.

In this case, the processor 130 may extract linear components within each image by applying a linear detection algorithm to each of the plurality of images. For example, the processor 130 may extract linear components included in each image through Hough transformation. The extracted linear components may include boundary lines 31, 32, and 33 between the plurality of stairs of the escalator 200, a safety line marked on the stair, a hand rail of the escalator 200, and the like.

In this way, among the linear components extracted from each image, the processor 130 may identify the boundary lines 31, 32, and 33 corresponding to boundaries between the plurality of adjacent stairs of the escalator 200. For example, the processor 130 may identify feature information of each linear component, and select the boundary line between the plurality of adjacent stairs of the escalator 200 from among the plurality of linear components based on the identified feature information. Alternatively, the processor 130 may compare the plurality of images, detect the linear component whose location is changed in each image, and use the detected linear components as the boundary lines 31, 32, and 33 between the plurality of adjacent stairs of the escalator 200. In addition, the processor 130 may use a neural network model trained to identify straight line components between the plurality of adjacent stairs of the escalator 200 from among the plurality of straight line components. In this case, the processor 130 may acquire result data for selecting the boundary lines 31, 32, and 33 between the plurality of adjacent stairs of the escalator 200 by inputting the image in which the linear component is detected to the neural network model.

Then, the processor 130 may select the boundary line of the first stair and the second stair from among the boundary lines 31, 32, and 33 between the plurality of stairs detected in each image, track the selected boundary line, and identify the movement direction and movement speed of the boundary line. Specifically, the processor 130 may track the boundary lines 30 between the first stair and the second stair, identify a change in the location of the boundary line 30 in each image, and identify the movement speed of the boundary line 30 based on the change in location of the identified boundary line and the frame rate of each image. The processor 130 may identify the movement speed of the identified boundary line 30 as the movement speed of the escalator 200.

Referring to FIG. 10, the processor 130 may detect linear components included in each of the images 13 and 14 in the first image 13 acquired at time t5 and the second image 14 acquired at time t6. Specifically, the processor 130 may include the stair where the robot 100 is located and the stair adjacent to the stair where the robot 100 is located in the movement direction of the escalator 200 in the plurality of linear components detected in the first image and the second image. There may be the boundary line between the stair adjacent to the stair where the robot 100 is located in the movement direction of the escalator 200 and the stair adjacent to the front of the stair. The processor 130 may identify the movement speed of the escalator 200 based on the change in the location of each linear component detected in the first image and the second image.

The processor 130 may extract normal vectors 40 and 41 with respect to the boundary line between the plurality of adjacent stairs of the escalator 200, and identify the movement direction of the escalator 200 based on the extracted normal vectors 40 and 41. Specifically, the processor 130 may identify the normal vectors 40 and 41 perpendicular to the boundary lines between the plurality of adjacent stairs. The processor 130 may identify the direction of the identified normal vectors 40 and 41 as the direction in which the locations of the linear components of the plurality of adjacent stairs are changed. For example, the processor 130 may identify a coordinate value of a boundary line in a 2D coordinate space based on a location of a boundary line between a plurality of adjacent stairs in an image, and identify the normal vectors 40 and 41 with respect to the boundary line in the 2D coordinate space based on the identified coordinate value.

Referring back to FIG. 10, the processor 130 may extract the normal vectors 40 and 41 with respect to the boundary line from the first image acquired at time t5 and the second image acquired at time t6. This may be identified based on the change in the locations of the boundary lines identified in the first image and the boundary lines identified in the second image. In addition, the processor 130 may identify the direction of the extracted normal vectors 40 and 41 as the movement direction of the escalator 200. In this case, the processor 130 may identify, as north, the movement direction of the escalator 200 based on the extracted normal vectors 40 and 41.

Figure 11:
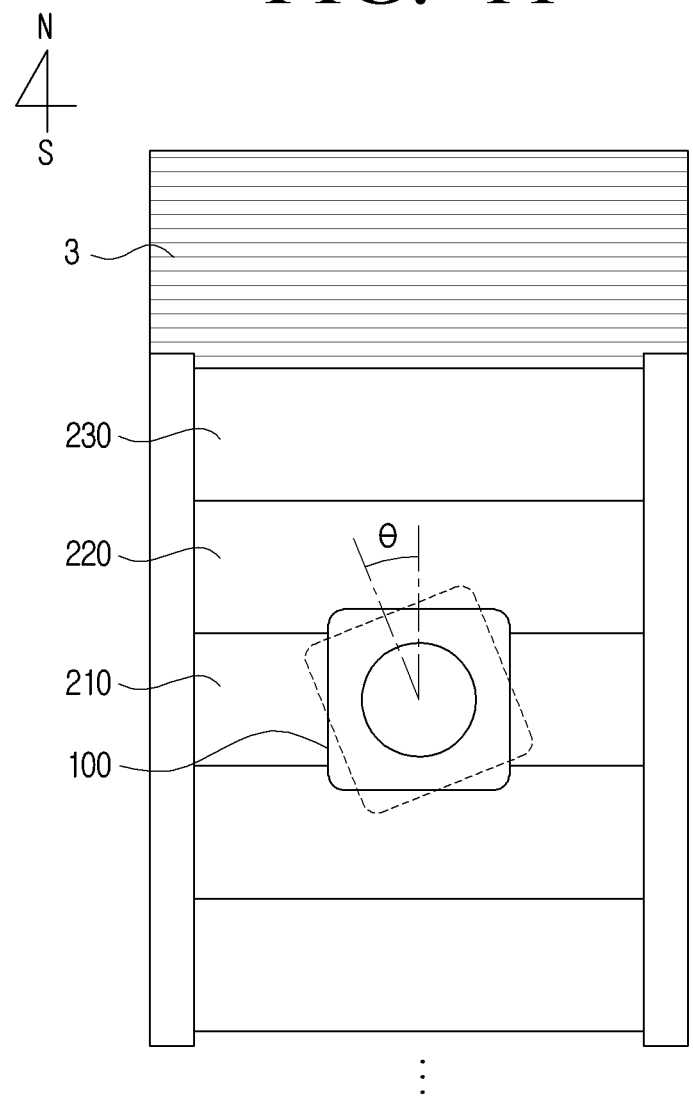
FIG. 11 is an exemplary diagram illustrating a method of controlling a robot to face a disembarkment direction determined based on a direction of an escalator according to one or more embodiments of the disclosure.

FIG. 11 is an exemplary diagram illustrating a method of controlling a robot to face a disembarkment direction determined based on a direction of an escalator according to one or more embodiments of the disclosure.

The processor 130 may identify a disembarkment direction of the robot 100 based on the identified movement direction of the escalator 200. For example, the processor 130 may identify the direction of the normal vectors with respect to the boundary line of the plurality of stairs as the disembarkment direction of the robot 100. That is, the processor 130 may identify the movement direction of the escalator 200 as the disembarkment direction of the robot 100.

The processor 130 may control the driver 120 so that the robot 100 faces the identified disembarkment direction. That is, the processor 130 may control the driver 120 of the robot 100 so that a direction of a body vector of the robot 100 coincides with the extracted normal vector. To this end, the processor 130 may generate the control information based on the movement direction of the escalator 200, and rotate a wheel included in the driver 120 based on the generated control information to control the robot 100 to face the disembarkment direction that is consistent with the movement direction of the escalator 200. That is, the processor 130 may control the driver 120 to align the robot 100 in the movement direction of the escalator 200.

Referring to FIG. 11, the processor 130 identifies the movement direction of the escalator 200 as north. In this case, the processor 130 may identify, as north, the disembarkment direction of the escalator 200 based on the movement direction of the escalator 200. The processor 130 may rotate the wheel so that the robot 100 faces north which is the disembarkment direction. Accordingly, the robot 100 may rotate in the north direction consistent with the movement direction of the escalator 200. As a result, the robot 100 may get off the escalator 200 more safely.

In addition, the processor 130 may accurately identify the movement direction of the escalator 200, and thus, control the driver 120 so that the robot 100 accurately moves on the escalator 200 in the opposite direction to the movement direction of the escalator 200.

Figure 12:
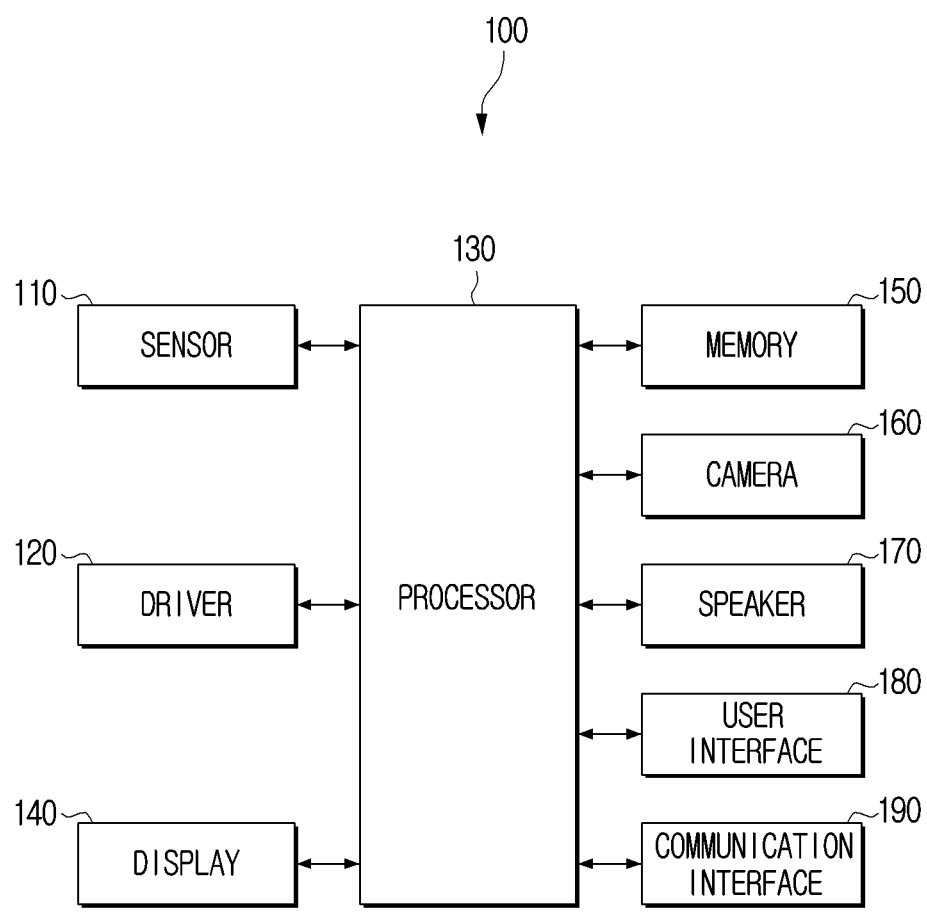
FIG. 12 is a detailed configuration diagram of a robot according to one or more embodiments of the disclosure.

FIG. 12 is a detailed configuration diagram of a robot according to one or more embodiments of the disclosure.

Referring to FIG. 12, the robot 100 includes at least one sensor 110, a driver 120, a display 140, a memory 150, a camera 160, a speaker 170, a user interface 180, and a communication interface 190. A detailed description for components overlapped with components illustrated in FIG. 2 among components illustrated in FIG. 12 will be omitted.

According to one or more embodiments of the disclosure, the sensor 110 may include one or more of a gesture sensor, a gyro sensor, a pressure sensor, a magnetic sensor, an acceleration sensor, a grip sensor, a proximity sensor, a color sensor (e.g., a red, green, and blue (RGB) sensor), a bio sensor, a temperature/humidity sensor, an illuminance sensor, or an ultra violet (UV) sensor in addition to at least one sensor (e.g., Lidar sensor, ToF sensor, etc.) detecting objects around the robot 100 as described above.

The display 140 may display various types of visual information. For example, the display 140 may display information on the map data, the traveling path of the robot 100, the movement direction and movement speed of the escalator 200, and the like.

To this end, the display 140 may be implemented as a display including a self-light emitting element or a display including a non-light emitting element and a backlight. For example, the display 140 may be implemented as various types of displays such as a liquid crystal display (LCD), an organic light emitting diodes (OLED) display, light emitting diodes (LED), a micro LED, a Mini LED, a plasma display panel (PDP), a quantum dot (QD) display, and quantum dot light-emitting diodes (QLED).

A driving circuit, a backlight unit, and the like, that may be implemented in a form of a-si TFT, low temperature poly silicon (LTPS) TFT, an organic TFT (OTFT), and the like, may be included in the display 140. Meanwhile, the display 140 may be implemented as a touch screen combined with a touch sensor, a flexible display, a rollable display, a 3D display, a display to which a plurality of display modules are physically connected, and the like.

In addition, the display 140 may be implemented as a touch screen together with the touch panel. Accordingly, the display unit 140 may function as an output unit for outputting the information between the robot 100 and the user, and at the same time, function as an input unit for providing an input interface between the robot 100 and the user.

The memory 150 may store data necessary for various embodiments of the disclosure. For example, the map data about the travel space where the robot 100 is located may be stored in the memory 150.

The memory 150 may be implemented in a form of a memory embedded in the robot 100 or in a form of a memory attachable to and detachable from the robot 100, depending on a data storage purpose. For example, data for driving the robot 100 may be stored in the memory embedded in the robot 100, and data for an extension function of the robot 100 may be stored in the memory attachable to and detachable from the robot 100.

The memory embedded in the robot 100 may include at least one of, for example, a volatile memory (for example, a dynamic random access memory (DRAM), a static RAM (SRAM), a synchronous dynamic RAM (SDRAM), or the like), a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM), a flash memory (for example, a NAND flash, a NOR flash, or the like), a hard drive, or a solid state drive (SSD)).

In addition, the memory attachable to and detachable from the robot 100 may be implemented in the form of a memory card (e.g., compact flash (CF), secure digital (SD), micro secure digital (Micro-SD), mini secure digital (Mini-SD), extreme digital (xD), multi-media card (MMC), etc.), external memory (e.g., USB memory) connectable to a USB port, and the like.

According to an example, the memory 150 may store information on a plurality of neural networks (or artificial intelligence) models. For example, the memory 150 may store a neural network model trained to identify the embarkment area on the image acquired through the camera 110 and a neural network model trained to identify the disembarkment area 3 on an image acquired through the camera 110.

Here, storing the information on the neural network model may mean storing various types of information related to the operation of the neural network model, for example, information on at least one layer included in the neural network model, information on parameters, bias, etc., used in each of the at least one layers, and the like. However, it goes without saying that the information on the neural network model may be stored in the internal memory of the processor 130 according to the implementation form of the processor 130. For example, when the processor 130 is implemented as dedicated hardware, the information on the neural network model may be stored in the internal memory of the processor 130.

The speaker 170 may output a sound signal to the outside of the robot 100. The speaker 170 may output multimedia reproduction, recording reproduction, various kinds of notification sounds, voice messages, and the like. The robot 100 may include an audio output device such as a speaker 170, or may include an output device such as an audio output terminal. In particular, the speaker 170 may provide acquired information, information processed/produced based on the acquired information, a response result to a user's voice, an operation result, or the like in the form of voice. For example, the processor 130 may output a warning sound through the speaker 170 when it is identified that the robot 100 is located within the disembarkment area 3 of the escalator 200 and an object exists in the disembarkment area 3 within the predetermined distance.

The user interface 180 is a component used for the robot 100 to interact with a user, and the processor 130 may receive various types of information, such as the control information of the robot 100, the travel space (e.g., map data for the travel space, etc.) information where the robot 100 is located, and the information on the escalator 200, through the user interface 180. Meanwhile, the user interface 180 may include at least one of a touch sensor 110, a motion sensor 110, a button, a jog dial, a switch, or a microphone, but is not limited thereto.

The communication interface 190 may transmit and receive various types of content. For example, the communication interface 190 may receive or transmit signals from or to an external device (e.g., user terminal), an external storage medium (e.g., USB memory), an external server (e.g., web hard), etc., in a streaming or download method through communication methods such as AP-based Wi-Fi (wireless LAN network), Bluetooth, Zigbee, a wired/wireless local area network (LAN), a wide area network (WAN), Ethernet, IEEE 1394, a high-definition multimedia interface (HDMI), a universal serial bus (UBS), a mobile high-definition link (MHL), an audio engineering society/European broadcasting union (AES/EBU), optical, and coaxial.

Meanwhile, according to one or more embodiments of the disclosure, the processor 130 may transmit a signal requesting to stop the driving of the escalator 200 to the control server 400 of the escalator 200 through the communication interface 190. Alternatively, the processor 130 may transmit a control signal for stopping driving of the escalator 200 to the escalator 200 through the communication interface 190.

Also, the processor 130 may communicate with the user terminal through the communication interface 190. In this case, the processor 130 may receive the location information of the user terminal communicating through the communication interface 190 and control the driver 120 so that the robot 100 tracks the user terminal.

Figure 13:
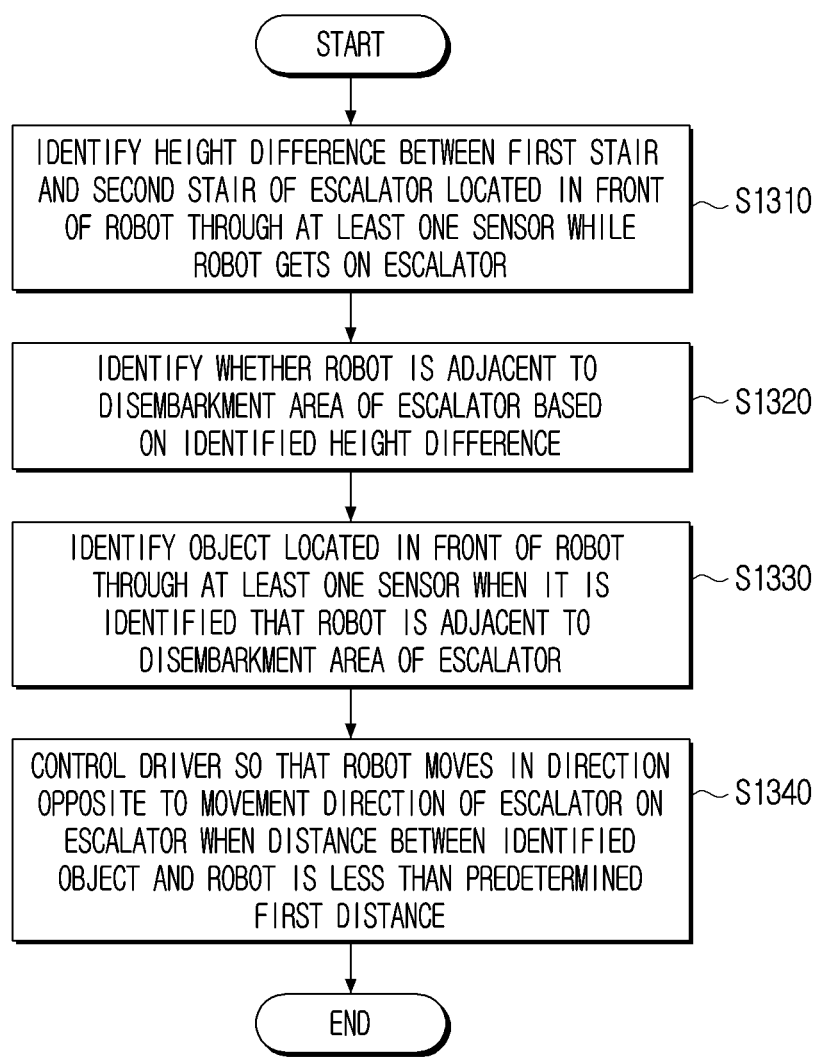
FIG. 13 is a flowchart schematically illustrating a method of controlling a robot to disembark, according to one or more embodiments of the disclosure.

FIG. 13 is a flowchart schematically illustrating a method of controlling a robot to disembark, according to one or more embodiments of the disclosure.

Referring to FIG. 13, while the robot 100 gets on the escalator 200, in operation S1310, the processor 130 may identify the height difference between the first stair and the second stair of the escalator 200 through at least one sensor 110 of the robot 100. In this case, the second stair may be a stair adjacent to the first stair in the escalator 200 in the movement direction of the escalator 200.

In operation S1320, the processor 130 may identify whether the robot 100 is adjacent to the disembarkment area 3 of the escalator 200 based on the identified height difference between the first stair and the second stair. Specifically, the processor 130 may identify that the robot 100 is adjacent to the disembarkment area 3 of the escalator 200 when the identified height difference between the first stair and the second stair is less than the predetermined height.

In operation S1330, when it is identified that the robot 100 is adjacent to the disembarkment area 3 of the escalator 200, the processor 130 may identify the object located in front of the robot 100 through at least one sensor 110.

In operation S1340, when the distance between the identified object and the robot 100 is less than the predetermined first distance, the processor 130 may control the driver 120 so that the robot 100 moves on the escalator 200 in a direction opposite to the movement direction of the escalator 200. In this case, the processor 130 may control the driver 120 so that the robot 100 moves in the direction opposite to the movement direction of the escalator 200 at the movement speed of the escalator 200. As a result, the robot 100 may wait while maintaining a constant location on the escalator 200 until the possibility of collision between the object existing in front of the robot 100 and the robot 100 disappears.

While the robot 100 moves in the direction opposite to the movement direction of the escalator 200, when it is identified that there is no object in the disembarkment area 3 through at least one sensor 110, the processor 130 may control the driver 120 to move the robot 100 according to the movement direction of the escalator 200, and control the robot 100 to get off the escalator 200 and enter the disembarkment area 3. That is, when it is identified that the object existing in front of the robot 100 has disappeared, the driver 120 may be controlled so that the robot 100 waiting on the escalator 200 enters the disembarkment area 3.

In addition, while the robot 100 moves in the direction opposite to the movement direction of the escalator 200, as the identified object moves within the disembarkment area 3, when the distance between the identified object and the robot 100 is equal to or greater than the predetermined first distance and less than the predetermined second distance, the processor 130 may control the driver 120 so that at least one of the plurality of wheels is located within the disembarkment area 3 and the remaining wheels are located on the escalator 200. The processor 130 may control the driver 120 so that the remaining wheels rotate in the direction opposite to the movement direction of the escalator 200 while the remaining wheels are located on the escalator 200.

Figure 14:
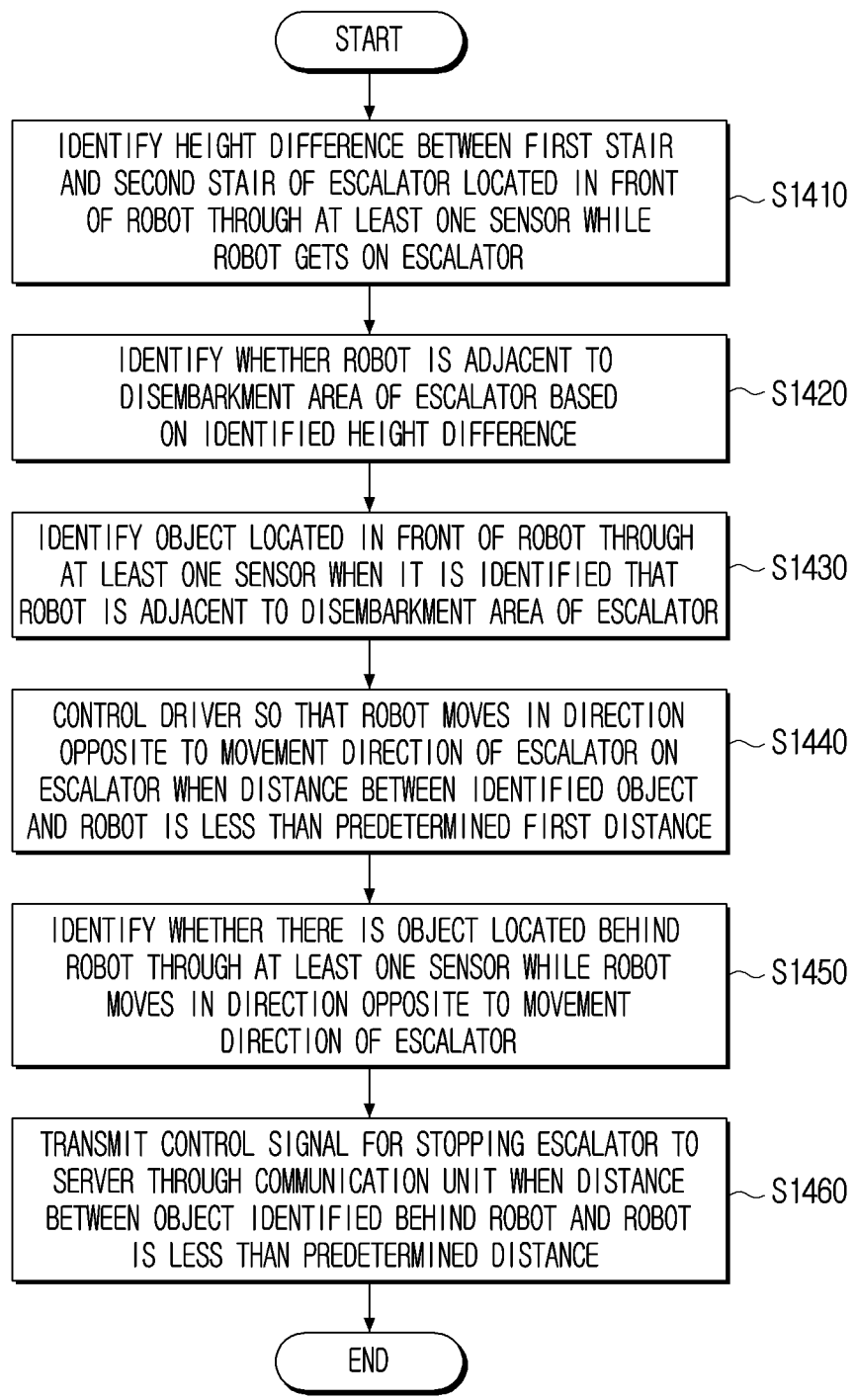
FIG. 14 is a flowchart schematically illustrating a method of controlling a robot when an object exists in front of and behind the robot, according to one or more embodiments of the disclosure.

FIG. 14 is a flowchart schematically illustrating a method of controlling a robot when an objects exist in front of and behind the robot, according to one or more embodiments of the disclosure.

Operations S1410, S1420, S1430, and S1440 illustrated in FIG. 14 may correspond to operations S1310, S1320, S1330, and S1340 described in FIG. 13. Therefore, a detailed description thereof will be omitted.

According to FIG. 14, according to one or more embodiments of the disclosure, in operation S1450, while the robot 100 moves in the direction opposite to the movement direction of the escalator 200, the processor 130 may identify whether an object located behind the robot 100 exists through at least one sensor 110.

In operation S1460, the processor 130 may transmit the control signal for stopping the escalator 200 through the communication interface (e.g., communication interface 190) of the robot 100 to the server 400 when the distance between the robot 100 and the object identified behind the robot 100 is less than a predetermined distance. Here, the control signal for stopping the escalator 200 may be a signal requesting the escalator 200 to be stopped. In addition, the processor 130 may directly transmit the control signal for stopping the escalator 200 to the escalator 200 through a communication interface (e.g., communication interface 190).

In the above description, operations S1310 to S1340 and S1410 to S1460 may be further divided into additional operations or combined into fewer operations according to one or more embodiments of the present disclosure. Also, some operations may be omitted if necessary, and an order between the operations may be changed.

The above-described methods according to various embodiments of the disclosure may be implemented in a form of application that can be installed in the existing robot. Alternatively, the above-described methods according to various embodiments of the disclosure may be performed using a deep learning-based learned neural network (or deep learned neural network), that is, a learning network model. In addition, the above-described methods according to various embodiments of the disclosure may be implemented only by software upgrade or hardware upgrade of the existing robot. In addition, various embodiments of the disclosure described above can be performed through an embedded server provided in the robot or a server outside the robot.

Meanwhile, according to one or more embodiments of the disclosure, various embodiments described above may be implemented by software including instructions stored in a machine-readable storage medium (for example, a computer-readable storage medium). A machine is a device capable of calling stored instructions from a storage medium and operating according to the called instruction, and may include the electronic device of the disclosed embodiments. In the case in which a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, according to one or more embodiments, the above-described methods according to the diverse embodiments may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In case of the online distribution, at least a portion of the computer program product may be at least temporarily stored in a storage medium such as a memory of a server of a manufacturer, a server of an application store, or a relay server or be temporarily generated.

In addition, each of components (for example, modules or programs) according to various embodiments described above may include a single entity or a plurality of entities, and some of the corresponding sub-components described above may be omitted or other sub-components may be further included in the diverse embodiments. Alternatively or additionally, some components (e.g., modules or programs) may be integrated into one entity and perform the same or similar functions performed by each corresponding component prior to integration. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

Although exemplary embodiments of the disclosure have been illustrated and described hereinabove, the disclosure is not limited to the above-mentioned specific exemplary embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A robot comprising:
   at least one sensor;
   a driver;
   at least one memory storing at least one instruction; and
   at least one processor configured to execute the at least one instruction to:
      identify, through the at least one sensor, a height difference between a first stair and a second stair of an escalator,
      identify whether the robot is adjacent to a disembarkment area of the escalator based on the identified height difference,
      based on identifying that the robot is adjacent to the disembarkment area, identify, through the at least one sensor, whether an object is located within a first distance of the robot in a movement direction of the escalator, and
      based on identifying the object located within the first distance of the robot in the movement direction of the escalator, control the driver to cause the robot to move on the escalator in a direction opposite to the movement direction of the escalator.

2. The robot of claim 1,
   wherein the second stair is a stair adjacent to the first stair in the movement direction of the escalator, and
   wherein the at least one processor is further configured to execute the at least one instruction to identify that the robot is adjacent to the disembarkment area of the escalator based on identifying that the identified height difference is less than a predetermined value.

3. The robot of claim 1, further comprising:
   a communication interface,
   wherein the at least one processor is further configured to execute the at least one instruction to:
      based on the driver causing the robot to move in the direction opposite to the movement direction of the escalator, identify, through the at least one sensor, whether a second object is located within a second distance of the robot in the direction opposite to the movement direction of the escalator, and
      based on identifying the second object located within the second distance of the robot in the direction opposite to the movement direction of the escalator, transmit a control signal for stopping the escalator through the communication interface.

4. The robot of claim 1, wherein the at least one processor is further configured to execute the at least one instruction to control the driver to cause the robot to move in the direction opposite to the movement direction of the escalator at a movement speed of the escalator.

5. The robot of claim 4, further comprising:
   a camera,
   wherein the at least one processor is further configured to execute the at least one instruction to:
      acquire a plurality of images of the escalator through the camera,
      based on identifying that the robot is adjacent to the disembarkment area of the escalator, identify a boundary line between the first stair and the second stair based on the acquired plurality of images, and
      identify the movement speed of the escalator based on a movement speed of the identified boundary line.

6. The robot of claim 4,
   wherein the at least one processor is further configured to execute the at least one instruction to:
      identify a third stair of the escalator based on the robot being positioned on the third stair,
      identify a fourth stair of the escalator based on the fourth stair being adjacent to the third stair in the movement direction of the escalator, and
      identify the movement speed of the escalator based on an elapsed time between a first time corresponding to identifying an initial height difference between the third stair and the fourth stair and a second time corresponding to identifying a maximum height difference between the third stair and the fourth stair.

7. The robot of claim 1, wherein the at least one processor is further configured to execute the at least one instruction to:
   while the robot moves in the direction opposite to the movement direction of the escalator, based on identifying, through the at least one sensor, that the object located in the movement direction of the escalator is no longer located within the first distance of the robot, control the driver to cause the robot to move in the movement direction of the escalator and to enter the disembarkment area.

8. The robot of claim 1,
   wherein the driver comprises a plurality of wheels, and
   wherein the at least one processor is further configured to execute the at least one instruction to:
      while the robot moves in the direction opposite to the movement direction of the escalator, control the driver to cause at least one of the plurality of wheels to be located within the disembarkment area and to cause a remainder of the plurality of wheels to be located on the escalator, and control the driver to cause the remainder of the plurality of wheels to rotate in the direction opposite to the movement direction of the escalator.

9. A method of controlling a robot, the method comprising:
   identifying, through at least one sensor of the robot, a height difference between a first stair and a second stair of an escalator;
   identifying whether the robot is adjacent to a disembarkment area of the escalator based on the identified height difference;
   based on identifying that the robot is adjacent to the disembarkment area, identifying whether an object is located within a first distance of the robot in a movement direction of the escalator; and
   based on identifying the object located within the first distance of the robot in the movement direction of the escalator, controlling a driver of the robot to cause the robot to move on the escalator in a direction opposite to the movement direction of the escalator.

10. The method of claim 9,
    wherein the second stair is a stair adjacent to the first stair in the movement direction of the escalator, and
    wherein the identifying whether the robot is adjacent to the disembarkment area further comprises identifying that the robot is adjacent to the disembarkment area based on identifying that the identified height difference is less than a predetermined value.

11. The method of claim 9, further comprising:
    based on the driver causing the robot to move in the direction opposite to the movement direction of the escalator, identifying, through the at least one sensor, whether a second object is located within a second distance of the robot in the direction opposite to the movement direction of the escalator; and based on identifying the second object located within the second distance of the robot in the direction opposite to the movement direction of the escalator, transmitting a control signal for stopping the escalator through a communication interface of the robot.

12. The method of claim 9, wherein the controlling the driver further comprises controlling the driver to cause the robot to move in the direction opposite to the movement direction of the escalator at a movement speed of the escalator.

13. The method of claim 12, further comprising:
acquiring a plurality of images of the escalator through a camera of the robot;
based on identifying that the robot is adjacent to the disembarkment area of the escalator, identifying a boundary line between the first stair and the second stair based on the acquired plurality of images; and
identifying the movement speed of the escalator based on the movement speed of the identified boundary line.

14. The method of claim 12, further comprising:
identifying a third stair of the escalator based on the robot being positioned on the third stair;
identifying a fourth stair adjacent to the third stair in the movement direction of the escalator; and
identifying the movement speed of the escalator based on an elapsed time between a first time corresponding to identifying an initial height difference between the third stair and the fourth stair and a second time corresponding to identifying a maximum height difference between the third stair and the fourth stair.

15. The method of claim 9, further comprising:
while the robot moves in the direction opposite to the movement direction of the escalator, based on identifying, through the at least one sensor, that the object located in the movement direction of the escalator is no longer located within the first distance of the robot, controlling the driver to cause the robot to move in the movement direction of the escalator and to enter the disembarkment area.

16. A non-transitory computer readable medium having instructions stored therein, which when executed by at least one processor cause the at least one processor to execute a method of controlling a robot, the method comprising:
identifying, through at least one sensor of the robot, a height difference between a first stair and a second stair of an escalator;
identifying whether the robot is adjacent to a disembarkment area of the escalator based on the identified height difference;
based on identifying that the robot is adjacent to the disembarkment area, identifying whether an object is located within a first distance of the robot in a movement direction of the escalator; and
based on identifying the object located within the first distance of the robot in the movement direction of the escalator, controlling a driver of the robot to cause the robot to move on the escalator in a direction opposite to the movement direction of the escalator.

17. The non-transitory computer readable medium of claim 16,
wherein the second stair is a stair adjacent to the first stair in the movement direction of the escalator, and
wherein the identifying whether the robot is adjacent to the disembarkment area further comprises identifying that the robot is adjacent to the disembarkment area based on identifying that the identified height difference is less than a predetermined value.

18. The non-transitory computer readable medium of claim 16, wherein the method further comprises:
based on the driver causing the robot to move in the direction opposite to the movement direction of the escalator, identifying, through the at least one sensor, whether a second object is located within a second distance of the robot in the direction opposite to the movement direction of the escalator; and
based on identifying the second object located within the second distance of the robot in the direction opposite to the movement direction of the escalator, transmitting a control signal for stopping the escalator through a communication interface of the robot.

19. The non-transitory computer readable medium of claim 16, wherein the controlling the driver further comprises controlling the driver to cause the robot to move in the direction opposite to the movement direction of the escalator at a movement speed of the escalator.

20. The non-transitory computer readable medium of claim 19, wherein the method further comprises:
acquiring a plurality of images of the escalator through a camera of the robot;
based on identifying that the robot is adjacent to the disembarkment area of the escalator, identifying a boundary line between the first stair and the second stair based on the acquired plurality of images; and
identifying the movement speed of the escalator based on the movement speed of the identified boundary line.

* * * * *